United States Patent
Abe

(10) Patent No.: US 9,438,762 B2
(45) Date of Patent: Sep. 6, 2016

(54) IMAGE SENSOR IC HAVING LINEARLY AND OBLIQUELY DISPOSED LIGHT RECEIVING ELEMENTS AND CONTACT IMAGE SENSOR USING SAME

(75) Inventor: Ichihiro Abe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 897 days.

(21) Appl. No.: 13/517,157

(22) PCT Filed: Jul. 9, 2010

(86) PCT No.: PCT/JP2010/004479
§ 371 (c)(1),
(2), (4) Date: Jun. 19, 2012

(87) PCT Pub. No.: WO2011/104771
PCT Pub. Date: Sep. 1, 2011

(65) Prior Publication Data
US 2012/0261556 A1    Oct. 18, 2012

(30) Foreign Application Priority Data

Feb. 24, 2010   (JP) .................................. 2010-038644

(51) Int. Cl.
*H01L 27/00*   (2006.01)
*H04N 1/46*    (2006.01)
(Continued)

(52) U.S. Cl.
CPC .......... *H04N 1/1931* (2013.01); *H04N 1/0311* (2013.01); *H04N 1/0312* (2013.01); *H04N 1/1933* (2013.01); *H04N 1/1934* (2013.01)

(58) Field of Classification Search
CPC ............. H04N 1/1931; H04N 1/1933; H04N 1/1934; H04N 1/0312; H04N 1/0311; H04N 5/335; H04N 9/083; H04N 9/04; H04N 3/14; H01L 27/14603; H01L 27/14605; H01L 27/14607; H01L 27/14601; H01L 27/14806; H01L 27/14812

USPC ....... 250/208.1, 214 R, 214.1; 358/513, 514, 358/482, 483; 348/266, 272, 273, 275, 280
See application file for complete search history.

(56) References Cited

U.S. PATENT DOCUMENTS 4,763,189 A * 8/1988 Komatsu et al. ............. 358/513
4,999,484 A   3/1991 Kaneko
(Continued)

FOREIGN PATENT DOCUMENTS

| JP | 2 87869 | 3/1990 |
|----|---------|--------|
| JP | 4 40060 | 2/1992 |

(Continued)

OTHER PUBLICATIONS

International Search Report Issued Aug. 17, 2010 in PCT/JP10/04479 Filed Jul. 9, 2010.
(Continued)

*Primary Examiner* — Pascal M Bui Pho
*Assistant Examiner* — Jennifer Bennett
(74) *Attorney, Agent, or Firm* — Oblon, McClelland, Maier & Neustadt, L.L.P

(57) ABSTRACT

An image sensor IC includes: light receiving elements disposed linearly adjacent to each other on a surface of a quadrilateral semiconductor substrate having opposite parallel sides, and disposed oblique to at least one set of opposite sides from a predetermined position on one side thereof to be opposed in the semiconductor substrate to a predetermined position on the other side thereof; and interpolation elements provided at one end portion or both end portions of the one set of opposite sides on a side of a region in which an angle formed by the linearly disposed light receiving elements and the set of opposite sides is obtuse, the interpolation elements having an oblique angle to the linearly disposed light receiving elements and receiving light on an outer side of the linearly disposed light receiving elements.

8 Claims, 16 Drawing Sheets

(51) Int. Cl.
*H04N 1/193* (2006.01)
*H04N 1/031* (2006.01)

(56) References Cited

U.S. PATENT DOCUMENTS

| | | | |
|---|---|---|---|
| 5,233,442 A * | 8/1993 | Kawai et al. | 358/482 |
| 5,315,412 A * | 5/1994 | Mihara et al. | 358/512 |
| 5,357,351 A * | 10/1994 | Nakajima et al. | 358/482 |
| 5,902,993 A * | 5/1999 | Okushiba | H04N 1/02835 250/205 |
| 6,654,056 B1 | 11/2003 | Perregaux et al. | |
| 6,969,838 B2 | 11/2005 | Endo et al. | |
| 2003/0151075 A1* | 8/2003 | Shizukuishi | H01L 27/14812 257/225 |

FOREIGN PATENT DOCUMENTS

| | | |
|---|---|---|
| JP | 6 218985 | 8/1994 |
| JP | 7 52451 | 2/1995 |
| JP | 9 321953 | 12/1997 |
| JP | 10 304154 | 11/1998 |
| JP | 11 331492 | 11/1999 |

OTHER PUBLICATIONS

Extended European Search Report issued Nov. 22, 2013 in European Patent Application No. 10846439.7.

* cited by examiner (a)

(b)

(C)

(d) Data for 288 Pixels + 1 Interpolation Pixel

IMAGE SENSOR IC HAVING LINEARLY AND OBLIQUELY DISPOSED LIGHT RECEIVING ELEMENTS AND CONTACT IMAGE SENSOR USING SAME

TECHNICAL FIELD

The present invention relates to an image sensor IC for use in a multichip type image sensor used in a document reading unit of a facsimile, a copier, a scanner or the like, and a contact image sensor using the same.

BACKGROUND ART

A multichip-mounting type contact image sensor in which a plurality of sensor chips are arranged linearly to form a one-dimensional scanning type image sensor is widely available. When the multichip type sensor chips are applied thereto, a gap between the sensor chips is in principle necessitated in manufacturing terms. On the other hand, with an increase in the high density of contact image sensors, there arises a problem of how to deal with a virtual pixel on the gap between the sensor chips.

FIG. 3 of Japanese Patent Application Publication No. H11-331492 (see Patent Document 1), for example, discloses a multichip type image sensor in which an IC chip 10 having a high light receiving unit surface 10a and an IC chip 11 having a low light receiving unit surface 11a are arranged alternately on a substrate 9, and an inclined surface 10c is formed as a cutout portion on an end surface of the IC chip 10 such that the IC chip 10 takes an inverse trapezoidal shape.

FIG. 9 of Japanese Patent Application Publication No. H7-52451 (see Patent Document 2) discloses an LED array in which LED elements 33 are formed in a trapezoidal shape with isosceles and inverted trapezoids of the LED elements arranged alternately in a horizontal row to thus increase the packing density of the LED elements.

FIG. 4 of Japanese Patent Application Publication No. H6-218985 (see Patent Document 3) discloses a reading apparatus in which the rigidity of a rotary blade is increased and dicing is performed with tilting the rotary blade to thus project a front side edge 3a of an optical element chip 1 and recede a rear side edge 3b thereof.

As another countermeasure against missing pixels, Japanese Patent Application Publication No. H2-87869 (see Patent Document 4), for example, discloses a multichip type image sensor in which IC image sensor chips 3 are arranged in a zigzag pattern such that the continuity of the pixel receptors of the IC image sensor chips 3 is maintained.

Patent Document 1: Japanese Patent Application Publication No. H11-331492 (FIG. 3)
Patent Document 2: Japanese Patent Application Publication No. H7-52451 (FIG. 9)
Patent Document 3: Japanese Patent Application Publication No. H6-218985 (FIG. 4)
Patent Document 4: Japanese Patent Application Publication No. H2-87869 (FIG. 1)

SUMMARY OF THE INVENTION

In the example described in Patent Document 1, however, the IC chip 10 having the high light receiving unit surface 10a and the IC chip 11 having the low light receiving unit surface 11a are arranged alternately, which poses a problem such that two types of IC chips must be used.

In the example described in Patent Document 2, although the packing density of the LED elements 33 can be increased by forming the LED elements 33 in a trapezoidal shape, there is no description of the gap between the LED elements 33 adjacent to each other.

In the example described in Patent Document 3, upon automatic packaging using a die bonder and so on, the chips need to be separated from each other in advance before packaging in consideration of collisions (contact) between the chips caused by a packaging precision. Further, even though the packaging can be achieved with a high degree of precision, the chips are mechanically packaged on an adhesive such as silver paste 8 positioned below the chips, and therefore there is a problem such that the positions of the chips after packaging are shifted.

In the example described in Patent Document 4, the image sensor chips 3 are arranged in a zigzag pattern, and therefore sub-scanning direction positions of pixels differ between adjacent image sensor chips 3 to render unnatural images on which a large number of pixels are different for each image sensor chip 3, which poses a problem to cause a degradation in quality of the images.

The present invention is made to solve the problems described above, and an object of the invention is to provide a high density-capable image sensor IC in which virtual pixels are not generated even when sensor chips are arranged at a predetermined pitch, and a contact image sensor using the image sensor IC.

An image sensor IC according to one or more embodiments of the disclosed subject matter includes: light receiving elements disposed linearly adjacent to each other on a surface of a quadrilateral semiconductor substrate having opposite parallel sides, and disposed oblique to at least one set of opposite sides from a predetermined position on one side thereof to be opposed in the semiconductor substrate to a predetermined position on the other side thereof; and an interpolation element provided at one end portion or both end portions of the one set of opposite sides on a side of a region in which an angle formed by the linearly disposed light receiving elements and the set of opposite sides is obtuse, the interpolation elements having an oblique angle to the linearly disposed light receiving elements and receiving light on an outer side of the linearly disposed light receiving elements.

An image sensor IC according to one or more embodiments of the disclosed subject matter can include is a drive circuit for driving the light receiving elements and the interpolation element is divided between both sides of the semiconductor substrate with the linearly disposed light receiving elements as a division.

According to one or more embodiments of the disclosed subject matter, the semiconductor substrates are arranged at an equal pitch, and the light receiving elements and the interpolation elements are extended in a straight line.

An image sensor IC according to one or more embodiments of the disclosed subject matter can include a plurality of filters having different optical wavelengths that transmit or block light are coated or vapor-deposited on the light receiving surfaces of the individual light receiving element and the individual interpolation element.

An image sensor IC according to one or more embodiments of the disclosed subject matter can include filters having different optical wavelengths that transmit or block light are coated or vapor-deposited on the light receiving surfaces of the light receiving elements and the interpolation element, wherein the light receiving elements and the interpolation element are segregated into a conveyance direction or a reverse conveyance direction for each different optical wavelength.

A contact image sensor according to one or more embodiments of the disclosed subject matter includes: an image sensor IC having light receiving elements disposed linearly adjacent to each other on a surface of a quadrilateral semiconductor substrate having opposite parallel sides, and disposed oblique to at least one set of opposite sides from a predetermined position on one side thereof to be opposed in the semiconductor substrate to a predetermined position on the other side thereof, and an interpolation element provided at one end portion or both end portions of the one set of opposite sides on a side of a region in which an angle formed by the linearly disposed light receiving elements and the set of opposite sides is obtuse, the interpolation elements having an oblique angle to the linearly disposed light receiving elements and receiving light on an outer side of the linearly disposed light receiving elements; a lens body disposed along the light receiving elements of the image sensor IC, and converging light reflected by an irradiation subject conveyed in a conveyance direction to cause the image sensor IC to receive the light; and a sensor substrate on which the image sensor IC is mounted.

A contact image sensor according to one or more embodiments of the disclosed subject matter include a drive circuit for driving the light receiving elements and the interpolation element is divided between both sides of the semiconductor substrate with the linearly disposed light receiving elements as a division.

According to one or more embodiments of the disclosed subject matter the semiconductor substrates are arranged at an equal pitch, and the light receiving elements and the interpolation elements are extended in a straight line.

A contact image sensor according to one or more embodiments of the disclosed subject matter can include a plurality of filters having different optical wavelengths that transmit or block light are coated or vapor-deposited on the light receiving surfaces of the individual light receiving element and the individual interpolation element.

A contact image sensor according to one or more embodiments of the disclosed subject matter can include filters having different optical wavelengths that transmit or block light are coated or vapor-deposited on the light receiving surfaces of the light receiving elements and the interpolation element, wherein the light receiving elements and the interpolation element are disposed linearly in parallel to a conveyance direction or a reverse conveyance direction for each different optical wavelength.

With the image sensor IC and the contact image sensor using the same of the invention, it is possible to obtain a high density-capable image sensor IC in which virtual pixels are not generated even when the sensor ICs are arranged at a predetermined pitch, and a contact image sensor using the same.

BEST MODE FOR CARRYING OUT THE INVENTION

First Embodiment

Figure 1:
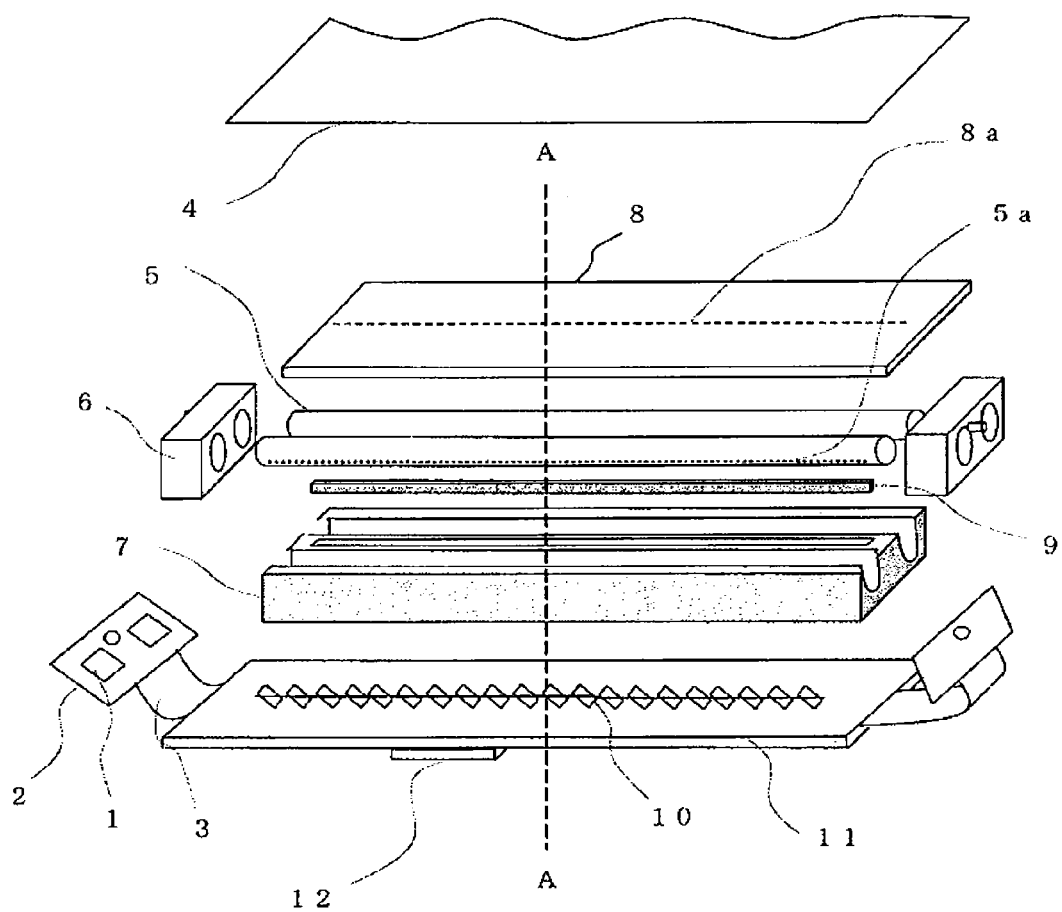
FIG. 1 is a development diagram for assembly of a contact image sensor in accordance with a first embodiment of the present invention.

In the following, a first embodiment of the present invention will be described below with reference to FIG. 1. FIG. 1 is a development diagram illustrating of a contact image sensor for assembly in accordance with a first embodiment of the invention. In FIG. 1, a light source 1 is a light emitter such as an LED chip or a versatile molded-type LED. The light source 1 is mounted on a substrate 2. A flexible substrate 3 is adhered to the substrate 2 to supply power to the light source 1.

An irradiation subject 4 is a document, banknote, or the like to be relatively conveyed. A light guide 5 is constituted by a transparent member made of a glass material, acrylic resin, or the like, and a light scattering layer (light reflecting layer) 5a is provided in contact with the light guide 5. A holder 6 has a cavity section interiorly; the light source 1 is disposed on one end side thereof within the cavity, and an end portion of the light guide 5 is fitted thereinto to be fixed on the other end side thereof. A casing 7 accommodates or holds the light source 1, the light guide 5 and so on.

A transmission body 8 is constituted by a transparent member made of a glass material, acrylic, or the like, and is used to protect the interior of a contact image sensor (CIS). A reading position 8a denotes a position on the transmitter 8 in a main scanning direction (reading width direction), and is not a physical component. A rod lens array or the like is employed for a lens body 9, scattered light from the irradiation subject 4 is incident thereon, and the scattered light is converged to form an image. A sensor IC 10, also referred to as a sensor IC, is disposed on an optical axis of the lens body 9 to receive the light converged by the lens body 9. The sensor IC 10 includes a light receiving unit (photoelectric conversion unit) formed on a surface of a semiconductor substrate, and is composed of a drive circuit including a shift register, a latch circuit, a switch, and so on for driving the light receiving unit. A sensor substrate 11, on which the sensor IC 10 is mounted, performs signal processing on photoelectric conversion output received by the light receiving unit of the sensor IC 10 to signal processing, and are equipped with an external connector, electronic components, a signal processing circuit, and so on. In the drawing, identical reference symbols denote identical or corresponding parts.

Next, an operation thereof will be described. In FIG. 1, the light irradiated from the light source 1 disposed in the holder 6 irradiates an end portion entrance region of the light guide 5. The light scattering layer 5a for scattering and reflecting light is formed on the light guide 5 in the main scanning direction by white silk printing or the like to thereby emit uniform light.

The light emitted from the light guide 5 irradiates the irradiation subject 4 located in the reading position 8a on the transmitter 8, reflection light (scattered reflection light) from the irradiation subject 4 is transmitted through the transmitter 8 to be converged by the lens body 9 and formed into an image in the light receiving unit (light receiving surface) of the sensor IC 10 configured with the semiconductor substrate. The sensor substrate 11 is equipped with electronic components, provided at the reverse side of the light receiving surface of the sensor IC 10, such as a power supply circuit to drive the sensor IC 10 and the light source 1, and an ASIC 12 (Application Specific Integrated Circuit) that is a signal processing circuit.

A plurality of the sensor ICs 10 are arranged and mounted on the sensor substrate 11 to be driven upon reception of a start signal (SI) and a clock signal (CLK). The signal output of each pixel subjected to photoelectric conversion on the light receiving surface of the sensor IC 10, and by opening/closing a group of switches sequentially in response to a shift signal from the shift register, and image signal is transmitted to the outside as an output signal. Further, the output for each line with respect to the irradiation subject 4 is transmitted to the signal processing circuit 12 as an analog signal sequentially or simultaneously on the basis of the readout signal synchronized with the clock signal (CLK).

Figure 2:
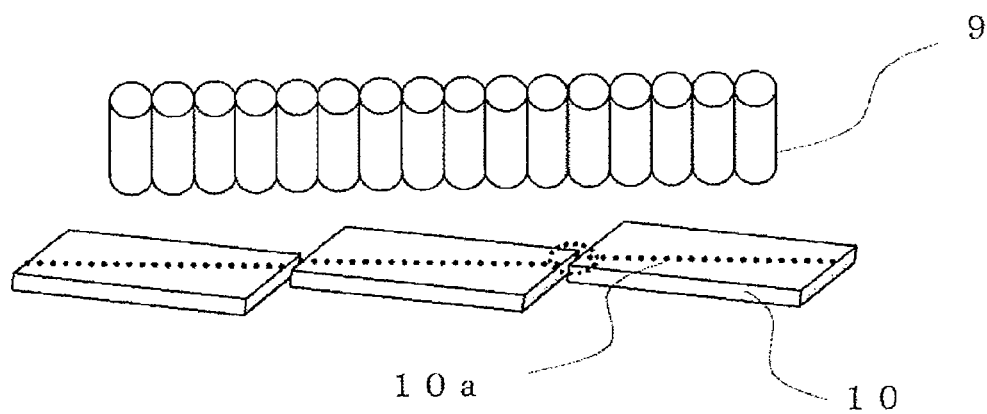
FIG. 2 is a view illustrating a positional relationship between an image sensor IC and a lens body in accordance with the first embodiment of the invention.

FIG. 2 is a view illustrating a positional relationship between the image sensor IC and the lens body 9 in accordance with the first embodiment of the invention. 10a denotes the light receiving unit (light receiving surface) of the sensor IC 10, and is referred to as a light receiving element (photoelectric conversion unit). The sensor IC 10 has a quadrilateral planar shape. In other words, a plane thereof takes the shape of a quadrangle, a parallelogram, or a rhombus. The light receiving elements 10a are disposed linearly on the sensor IC 10 and arranged oblique to at least one set of opposite sides (end surfaces) of the sensor IC 10.

More precisely, the light receiving elements 10a are disposed linearly adjacent to each other on a surface of a quadrilateral semiconductor substrate having parallel opposite sides. The light receiving elements 10a are disposed oblique to at least one set of opposite sides from a predetermined position (reading position) on one opposing side of the semiconductor substrate to a predetermined position (reading position) on the other side.

Further, the light receiving elements 10a are disposed along the lens body 9 to cover a reading width. In the drawing, identical reference numerals to those in FIG. 1 denote identical or corresponding parts.

Figure 3:
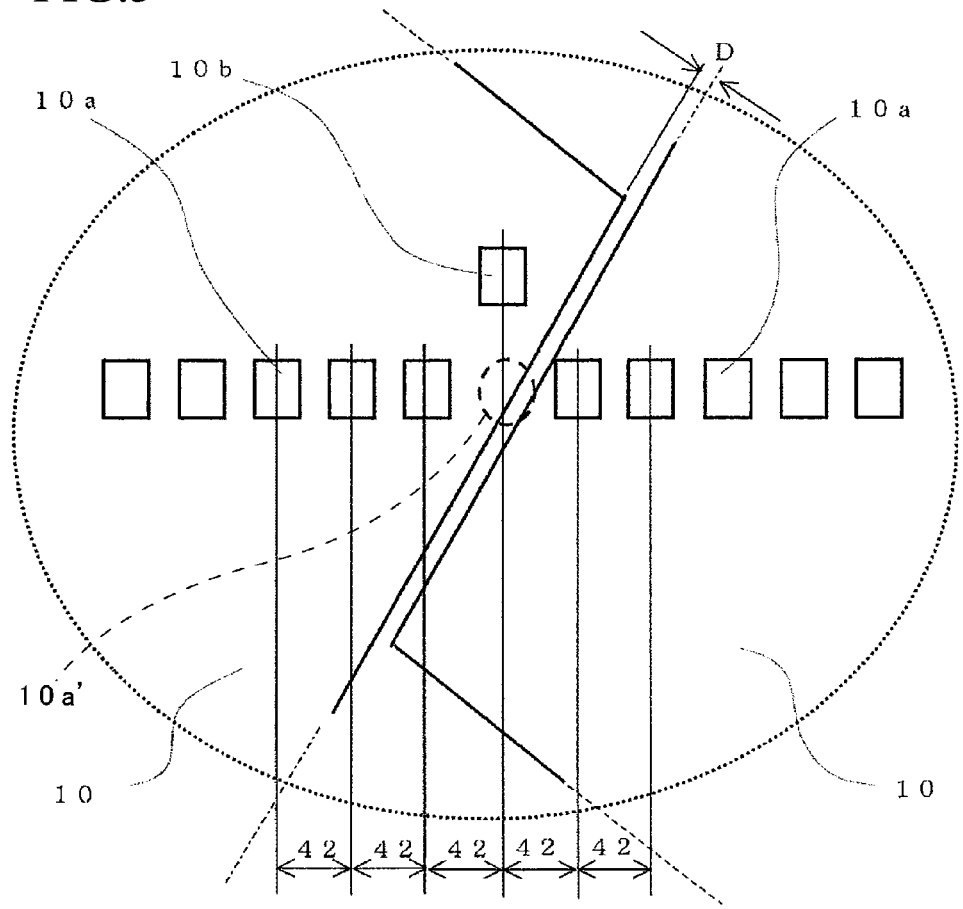
FIG. 3 is a partially enlarged plan view of the image sensor IC in accordance with the first embodiment of the invention.

FIG. 3 is a partially enlarged plan view of the image sensor IC in accordance with the first embodiment of the invention. In FIG. 3, 10b is an interpolation element (interpolation pixel) disposed at an end portion of the sensor IC 10. Incidentally, in FIG. 3, when the light receiving elements 10a are arranged in a straight line at the same pitch of 42 μm in the case that a gap (D) between adjacent sensor ICs 10 to each other is between 0.01 mm and 0.05 mm and also a pixel density of the light receiving element 10a is approximately 600 DPI, a virtual pixel (light receiving element positioned in a gap region of the IC and unable to be physically formed) 10a' is generated. Therefore, an interpolation pixel 10b is formed at an end portion position of the sensor IC 10 in an orthogonal direction to the linearly arranged light receiving elements 10a. The interpolation pixel 10b is used as a pixel for interpolating the virtual pixel 10a'.

More precisely, the interpolation pixel 10*b* is provided at one end portion or both end portions of a set of opposite sides on the side of a region in which an angle formed by the linearly disposed light receiving elements 10*a* and the set of opposite sides is wide or obtuse. Further, the interpolation pixel 10*b* has an oblique angle to the linearly disposed light receiving elements 10*a* and also is disposed on an outer side of the linearly disposed sensor ICs 10. In other words, the interpolation pixel 10*b* is disposed on the outer side of the line of the light receiving elements 10*a* in a formable region at the end portion of the semiconductor substrate where the oblique angle formed by the line of the light receiving element 10*a* and the opposite side is 90 degrees or more. In the drawing, identical reference numerals to those in FIG. 2 denote identical or corresponding parts.

Figure 4:
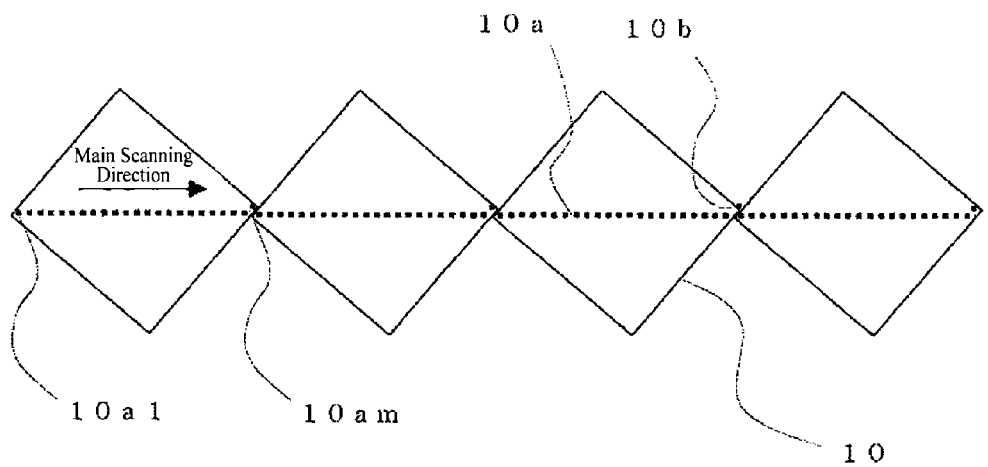
FIG. 4 is a view illustrating a line of sensor ICs in the image sensor IC in accordance with the first embodiment of the invention.

FIG. 4 is a view illustrating an arrangement of the sensor ICs in the image sensor IC in accordance with the first embodiment of the invention. The sensor ICs 10 are arranged at a constant pitch, and the light receiving elements 10*a* are disposed from one corner end portion of the sensor IC 10 to the other opposing corner end portion. The sensor ICs 10 are equally sized semiconductor substrates, cut out from a semiconductor wafer and directly subjected to die-bonding on the sensor substrate 11.

The interpolation pixel 10*b* is formed at the corner end portion of the sensor IC 10 to compensate for the virtual pixel 10*a*'. In FIG. 4, the interpolation pixel 10*b* is provided nearer the end portion on the side of a final pixel 10*am* as is started from a start pixel 10*a*1 that is a predetermined position of a readout sequence in the main scanning direction (reading width direction) of the sensor IC 10 to be ended at the final pixel 10*am*. In contrast, however, the interpolation pixel 10*b* may be provided nearer the end portion on the side of the start pixel 10*a*1 that is a predetermined position in the readout sequence of the sensor ICs 10. Further, the interpolation pixel 10*b* is preferably provided in a central position between the light receiving elements 10*a* adjacent to each other at the shortest distance between the adjacently disposed sensor ICs 10. In the drawing, identical reference numerals to those in FIG. 2 denote identical or corresponding parts.

Note that when the sensor ICs 10 are mounted on the sensor substrate 11 and used as a contact image sensor, n of the sensor ICs 10 are arranged linearly in the main scanning direction, and therefore the total number of the pixels including the interpolation pixels 10*b* is m×n+n.

Figure 5:
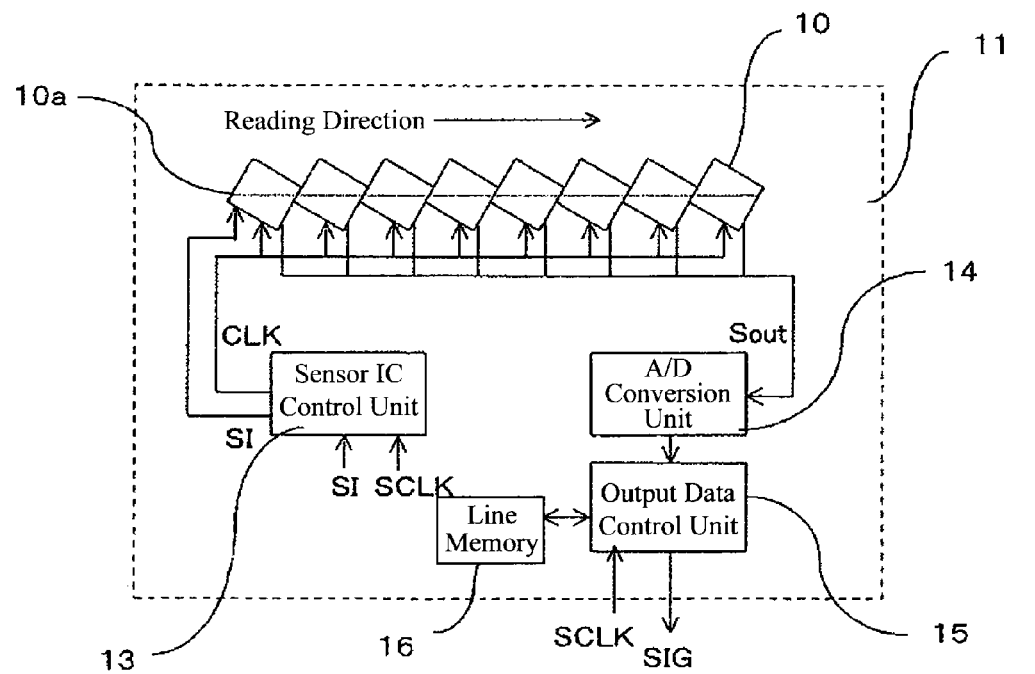
FIG. 5 is a view illustrating a drive circuit of a contact image sensor equipped with the image sensor IC in accordance with the first embodiment of the invention.

FIG. 5 is a view illustrating the drive circuit of the contact image sensor equipped with the image sensor IC in accordance with the first embodiment of the invention. In FIG. 5, a sensor IC control unit 13 synchronizes the start signal (SI) with the clock signal (CLK) and outputs photoelectric conversion signals stored in the light receiving elements 10*a* of the sensor ICs 10 sequentially in a readout direction as analog signals (Sout). An A/D conversion unit 14 performs digital conversion on the analog signals. An output data control unit (data control unit) 15 is configured to perform signal processing on the digitally converted analog signals, and includes each color correction circuit, each color data rearrangement circuit, a CPU, and so on to issue instructions from the CPU to a line memory 16 that temporarily stores the data of the interpolation pixels 10*b*. The sensor IC control unit 13, A/D conversion unit 14, data control unit 15, and line memory 16 are constituted in the ASIC 12 as an integrated circuit. In the drawing, identical reference numerals to those in FIG. 1 denote identical or corresponding parts.

Next, a circuit operation thereof will be described. The image data read by the interpolation pixel 10*b* differ from the image data of the other light receiving elements 10*a* to be read during the same period in their readout positions in an orthogonal direction (sub-scanning direction, document conveyance direction) to the main scanning direction, and thereby need to be corrected. Hence, among the digital image data output by the A/D conversion unit 14, the data simultaneously output from the interpolation pixel 10*b* is stored temporarily in the line memory 16 by the CPU of the data control unit 15 and read later.

Thereafter, when the irradiation subject 4 is conveyed to the position corresponding to the output of the light receiving element 10*a* on the line at the same sub-scanning position as that of the stored interpolation pixel 10*b*, the data control unit 15 reads from the line memory 16 the image data of the interpolation pixel 10*b* temporarily stored in the line memory 16. In other words, the data control unit 15 transposes the data of the interpolation pixel 10*b* read before several lines with the data of the interpolation pixel 10*b* read from the corresponding line (current line), and outputs the resultant from the ASIC 12 as final image data (SIG).

For example, in the case that the interpolation pixel 10*b* is separated from the other light receiving elements 10*a* by 84 μm in the document conveyance direction, when the conveyance speed of the irradiation subject 4 is 280 mm/sec, and also the reading speed per section of the contact image sensor is 0.15 ms/line, the data of the interpolation pixel 10*b* are converted to the data corrected after two lines reading and then output. In such a way, the image data corresponding to one line on the current line are corrected such that the final image data (SIG) are output without deviations with respect to a positional deviation in the sub-scanning direction between the interpolation pixel 10*b* and the other light receiving elements 10*a* on the line.

Figure 6:
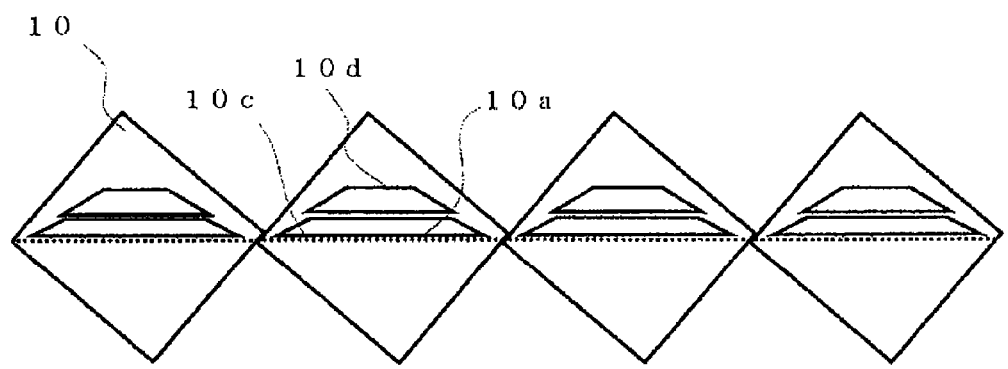
FIG. 6 is a view illustrating a drive circuit including a photoelectric conversion unit for the image sensor IC in accordance with the first embodiment of the invention.

FIG. 6 is a view illustrating the drive circuit including the photoelectric conversion unit for the image sensor IC in accordance with the first embodiment of the invention. A latch (LATCH) circuit region 10*c* is configured to include an analog switch that switches a large number of the light receiving elements 10*a* in sequence and transmits a stored charge to a common line. A shift register (SHIFT REGISTER) circuit region 10*d* is configured to cause start signals (SI) in sequence to be shifted to the latch circuit region 10*c* to thus open/close the analog switch in sequence. In the drawing, identical reference numerals to those in FIG. 1 denote identical or corresponding parts.

Figure 7:
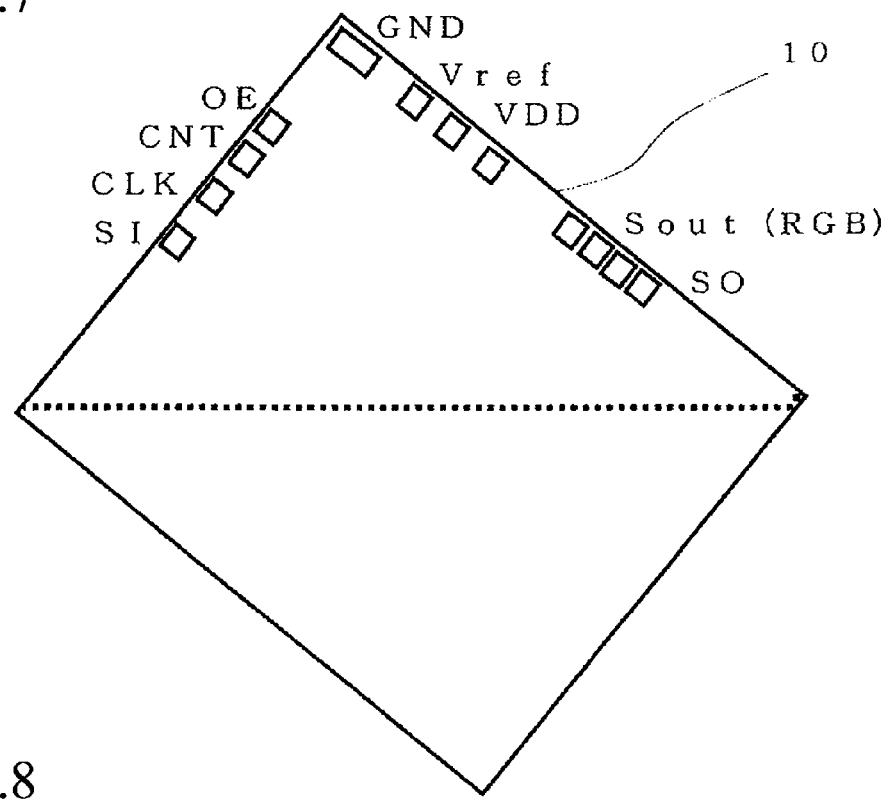
FIG. 7 is a view illustrating terminal positions of the image sensor IC in accordance with the first embodiment of the invention.

FIG. 7 is a view illustrating terminal positions of the image sensor IC in accordance with the first embodiment of the invention. SI is a start signal input terminal, CLK is a clock signal input terminal, CNT is a color/monochrome changeover input terminal, OE is a resolution changeover input terminal, Vref is a GND potential or reference level monitor output terminal, SO is a start signal output terminal for outputting the start signal (SI) continuously to an adjacent sensor IC 10, and Sout is image output terminals for outputting read outputs of different optical wavelengths such as RGB respectively; when the color/monochrome changeover input terminal (CNT) is set at logic L, image signals are transmitted from any or all of the output terminals as monochrome signals. VDD and GND denote power supply terminals. The input and output terminals are disposed at the end portions of the sensor ICs 10 except the latch circuit region 10*c* and the shift register circuit region 10*d*, and pads are connected at predetermined pattern positions on the sensor substrate 11 by wire bonding connection.

Of the input terminals, the input terminals other than the start signal input terminal (SI) are connected in common with the corresponding input terminals of each of the sensor ICs 10, respectively. Of the output terminals, the output terminals other than the start signal output terminal (SO) are connected in common with the corresponding output terminals of each of the sensor ICs 10, respectively.

Figure 8:
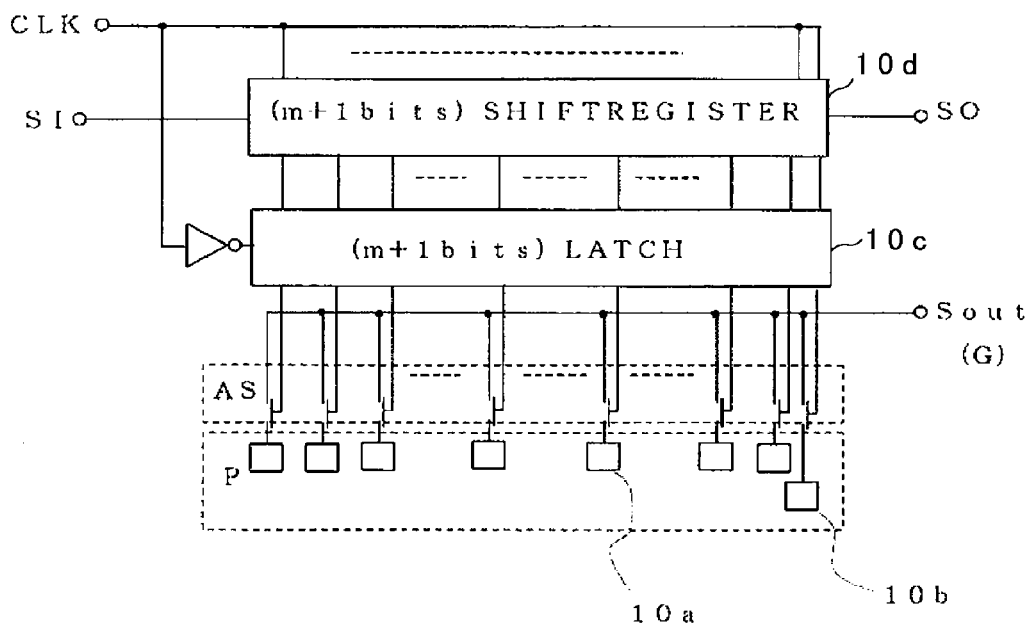
FIG. 8 is an internal circuit diagram of the image sensor IC in accordance with the first embodiment of the invention.

FIG. 8 is an internal circuit diagram of the image sensor IC in accordance with the first embodiment of the invention. The start signal (SI) input in synchronization with the clock signal (CLK) is shifted through the shift register circuit 10d constituted by a D/FF (D/flip-flop) circuit, such that an analog switch (AS) connected to the latch circuit 10c is opened/closed sequentially for a charge stored on a previous line of the light receiving element 10a constituted by a photodiode (P) or the like. Then, for the image output, photoelectric conversion currents or voltages connected to the common line are taken out in sequence as analog signals from the image output terminal (Sout). In this circuit, one of the interpolation pixel 10b is added thereto, and therefore the circuit holds one system of an m+1 bit shift register circuit 10d and latch circuit 10c and a corresponding analog switch group.

FIG. 8 illustrates the case of a monochrome reading when the color/monochrome changeover terminal (CNT) is set at logic L. Hence, the analog signal output is extracted from the Sout (G), and therefore the signals from the other Sout (R) and Sout (B) are unnecessary. In the case of a simultaneous output, only the Sout (G) is selected and subjected to signal processing by the signal processing circuit 12. Accordingly, in FIG. 8, a signal extraction circuit is provided as one system of the circuit for illustration of the monochrome reading, while a drive circuit of three systems including the Sout (G) is built into the sensor IC 10.

Note that although FIG. 8 illustrates the driving of a single sensor IC 10, start pulses input at the start signal input terminal (SI) of the sensor IC 10 at a first stage are shifted through the shift register circuit 10d and are input sequentially from the start signal output terminal (SO) of the sensor IC 10 to the SI terminal of the sensor IC 10 at a next stage. Therefore, for the Sout (G), n of the sensor ICs 10 are arranged linearly in the main scanning direction, so that the total number of the pixels including the interpolation pixels 10b is m×n+n; hence, although a sequential output of one line is obtained to the total number of the pixels, each unit of the sensors IC 10 is driven independently, namely division driven, so that a reading speed per line is increased by n times.

Figure 9:
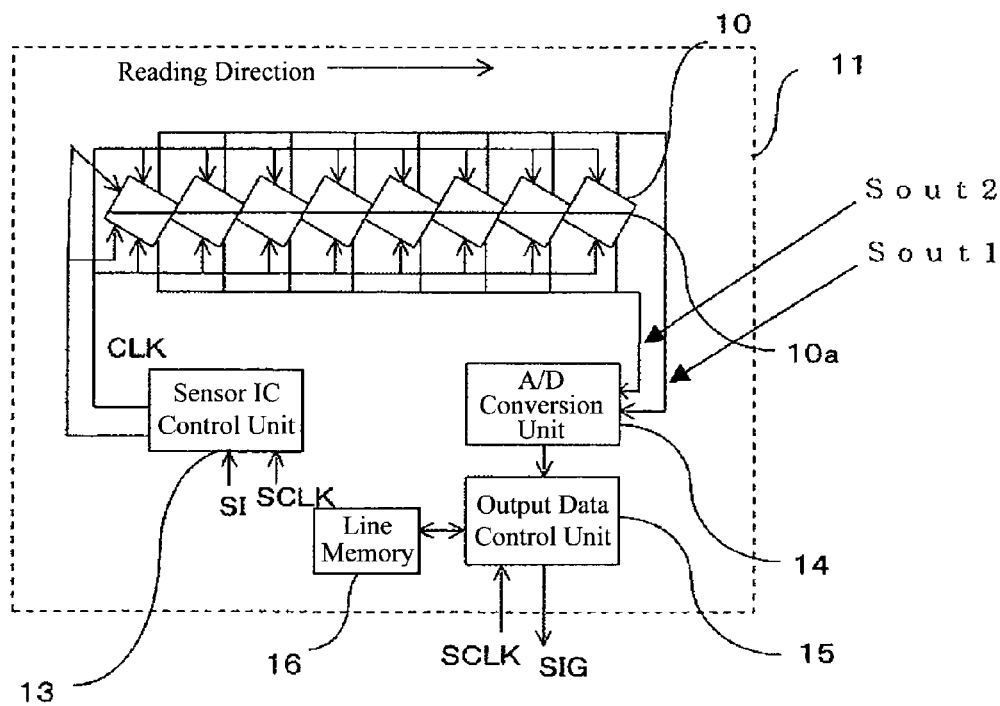
FIG. 9 is a view of another example illustrating the drive circuit of the contact image sensor equipped with the image sensor IC in accordance with the first embodiment of the invention.

FIG. 9 is a view illustrating another example of the drive circuit of the contact image sensor equipped with the image sensor IC in accordance with the first embodiment of the invention. In FIG. 9, the sensor IC control unit 13 synchronizes the start signal (SI) with the clock signal (CLK) and outputs the photoelectric conversion signals stored in the light receiving elements 10a of the sensor IC 10 sequentially in the reading direction as analog signals (Sout1, 2). The A/D conversion unit 14 performs digital conversion on the analog signals (Sout1, 2). The output data control unit 15 is configured to perform signal processing on the digitally converted analog signals, and includes each color correction circuit, each color data rearrangement circuit, a CPU, and so on to issue instructions from the CPU to the line memory 16 that temporarily stores the data of the interpolation pixels 10b. The sensor IC control unit 13, A/D conversion unit 14, data control unit 15, and line memory 16 are constituted in the ASIC 12 as an integrated circuit. In the drawing, identical reference numerals to those in FIG. 5 denote identical or corresponding parts.

Next, a circuit operation thereof will be described. The image data read by the interpolation pixel 10b differ from the image data of the other light receiving elements 10a to be read during the same period in their readout positions in an orthogonal direction (sub-scanning direction, document conveyance direction) to the main scanning direction, and thereby need to be corrected. Hence, among the digital image data output by the A/D conversion unit 14, the data simultaneously output from the interpolation pixel 10b is stored temporarily in the line memory 16 by the CPU of the data control unit 15 and read later.

Thereafter, when the irradiation subject 4 is conveyed to the position corresponding to the output of the light receiving elements 10a on the line at the same sub-scanning position as that of the stored interpolation pixel 10b, the data control unit 15 reads the image data of the interpolation pixel 10b temporarily stored in the line memory 16 from the line memory 16. In other words, the data control unit 15 replaces the data of the interpolation pixel 10b read before several lines with the data of the interpolation pixel 10b read on the corresponding line (current line), and then outputs the resultant from the ASIC 12 as the final image data (SIG).

Though in FIG. 5 the drive circuit of the sensor IC 10 is disposed with concentrated on only one side of the line of the light receiving elements 10a, in FIG. 9 the drive circuit of the sensor IC 10 is disposed on both sides across the line of the light receiving elements 10a of the sensor IC 10 (with the line as a division). In other words, the m-bit light receiving elements 10a of the sensor IC 10 are divided between odd number pixels and even number pixels.

Figure 10:
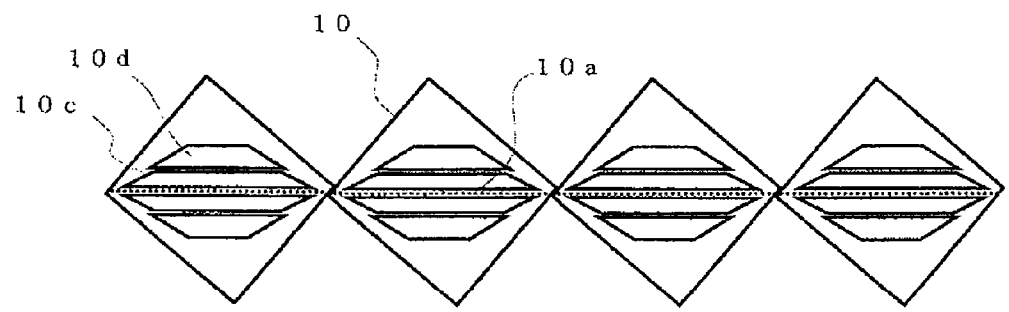
FIG. 10 is a view of another example illustrating the drive circuit including the photoelectric conversion unit for the image sensor IC in accordance with the first embodiment of the invention.

FIG. 10 is a view of another example illustrating a drive circuit including a photoelectric conversion unit for the image sensor IC in accordance with the first embodiment of the invention. A latch (LATCH) circuit region 10c is configured to include an analog switch that switches a large number of the light receiving elements 10a in sequence and transmits stored charges to a common line. A shift register (SHIFT REGISTER) circuit region 10d is configured to cause start signals (SI) in sequence to be shifted to the latch circuit region 10c to open/close the analog switch in sequence.

Figure 11:
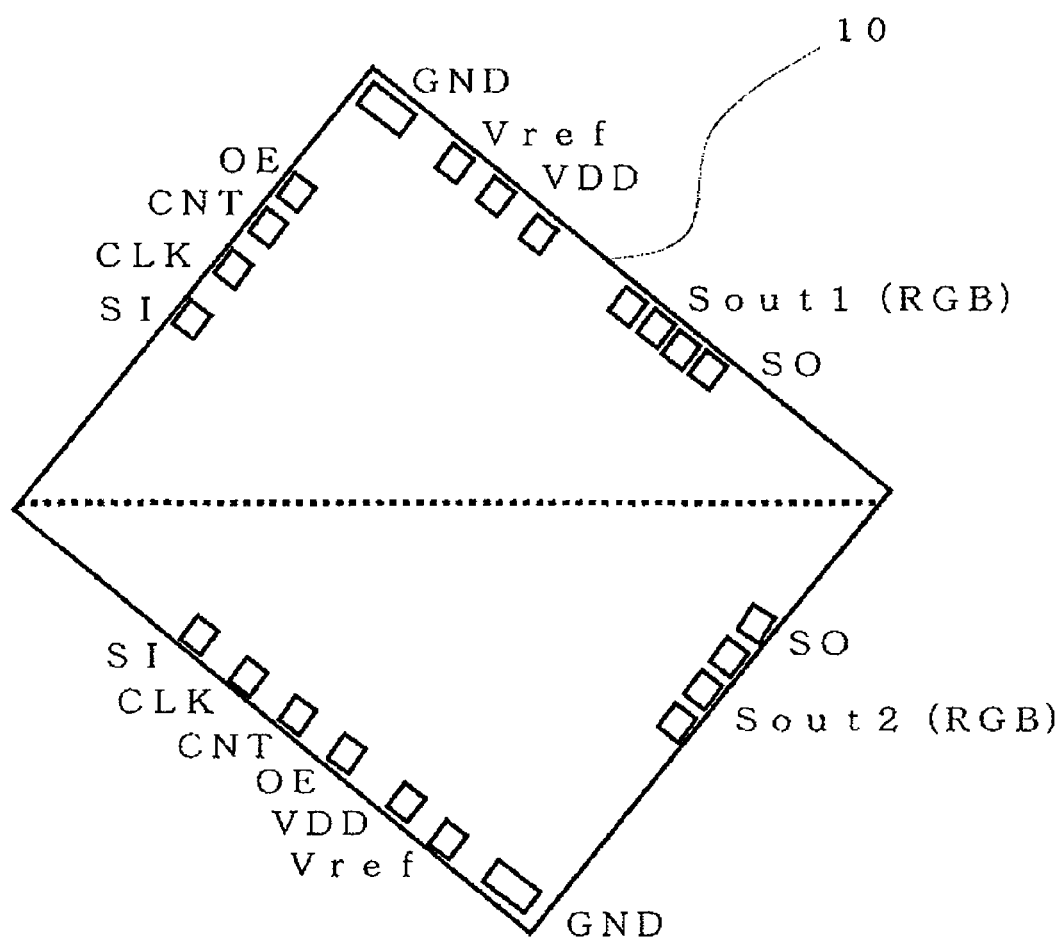
FIG. 11 is a view of another example illustrating the terminal positions of the image sensor IC in accordance with the first embodiment of the invention.

FIG. 11 is a view of another example illustrating terminal positions of the image sensor IC in accordance with the first embodiment of the invention. SI is a start signal input terminal, CLK is a clock signal input terminal, CNT is a color/monochrome changeover input terminal, OE is a resolution changeover input terminal, Vref is a GND potential or reference level monitor output terminal, SO is a start signal output terminal for outputting the start signal (SI) continuously to an adjacent sensor IC 10, and Sout 1, 2 each are image output terminals for outputting read outputs having different optical wavelengths such as RGB; when the color/monochrome changeover input terminal (CNT) is set at logic L, image signals are transmitted from any or all of the output terminals as monochrome signals. VDD and GND denote power supply input terminals. The input and output terminals are disposed at the end portions of the sensor ICs 10 except the latch circuit region 10c and the shift register circuit region 10d, and connection pads are connected in predetermined pattern positions on the sensor substrate 11 by wire bonding connection.

Of the input terminals, the input terminals other than the start signal input terminal (SI) are connected in common with the corresponding input terminals of each of the sensor IC 10s, respectively. Of the output terminals, the output terminals other than the start signal output terminal (SO) are connected in common with the corresponding output terminals of each of the other sensor ICs 10, respectively.

Figure 12:
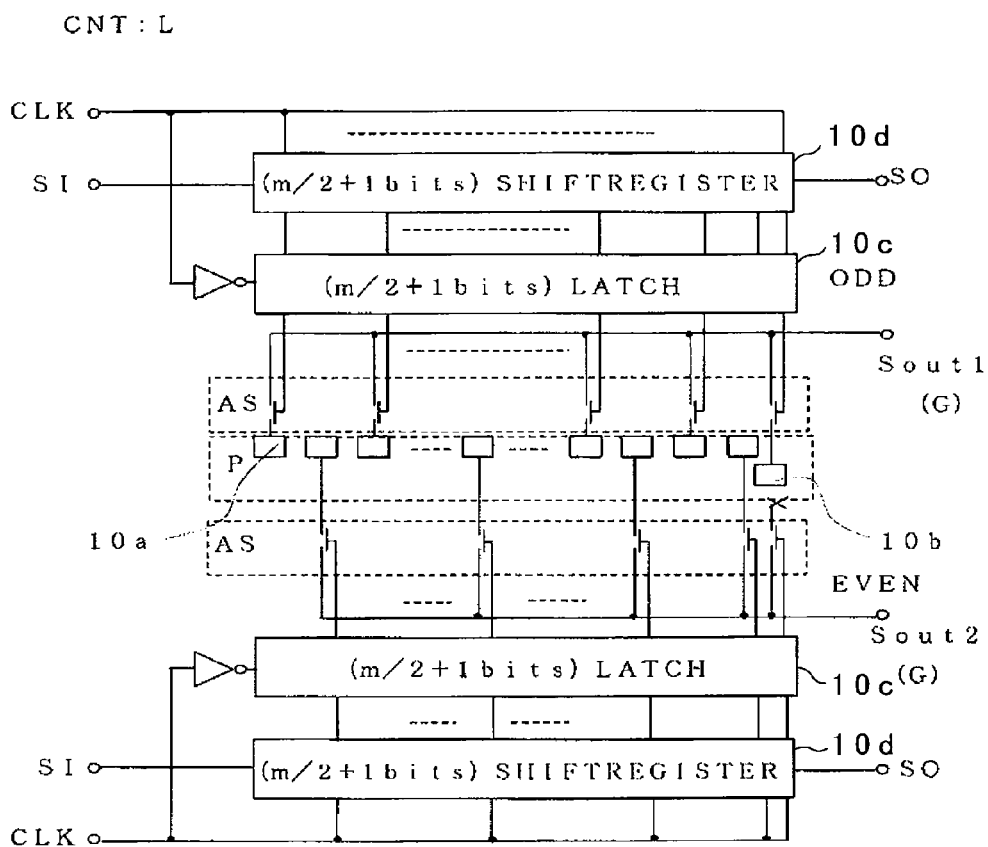
FIG. 12 is an internal circuit diagram of another example of the image sensor IC in accordance with the first embodiment of the invention.

FIG. 12 is an internal circuit diagram of another example of the image sensor IC in accordance with the first embodiment of the invention. A start signal (SI) input in synchronization with the clock signal (CLK) is shifted through the shift register circuit 10d constituted by a D/FF (D/flip-flop) circuit such that an analog switch (AS) connected to the latch circuit 10c is opened/closed sequentially for a charge stored on a previous line of the light receiving element 10a constituted by a photodiode (P) or the like. Then, for the image output, photoelectric conversion currents or voltages connected to the common line are taken out in sequence as analog signals from the image output terminals (Sout 1, 2). In this circuit, one of the interpolation pixel 10b is added thereto, and therefore the circuit holds two systems of an m/2+1 bit shift register circuit 10d and latch circuit 10c and an analog switch group.

FIG. 12 illustrates the case of a monochrome reading when the color/monochrome changeover terminal (CNT) is set at logic L. Hence, the analog signal output is extracted from the Sout1 (G) and Sout2 (G), and therefore signals from the other Sout1, 2(R) and Sout1, 2 (B) are unnecessary. In the case of a simultaneous output, only the Sout1, 2 (G) are selected and subjected to signal processing by the signal processing circuit 12. Accordingly, in FIG. 12, a signal extraction circuit is provided as one system of the RGB circuit for illustration of the monochrome reading, while a drive circuit of three systems including the Sout1, 2 (G) is built into the sensor IC 10.

The image data divided between odd number pixels and even number pixels are output alternately from the shift register of the data control unit 15 or the like and subjected to data position conversion using a rearrangement circuit.

Note that in FIG. 12, the interpolation pixel 10b is provided on the odd number side of the light receiving elements 10a, the even number side of the light receiving elements 10a is set as a dummy bit (bit not connected to the interpolation pixel) corresponding to the interpolation pixel 10b, and a shift pulse of the start signal (SI) is shared. However, when the start signal (SI) and the clock signal (CLK) are driven independently on the odd number side and the even number side, the dummy bit is unnecessary.

When the analog image data are divided between odd number pixels and even number pixels, the shift register circuit 10d and the latch circuit 10c are disposed on both sides of the sensor IC 10 to be easily disposed as a drive circuit within the sensor IC 10 even when the pixel density is high.

Figure 13:
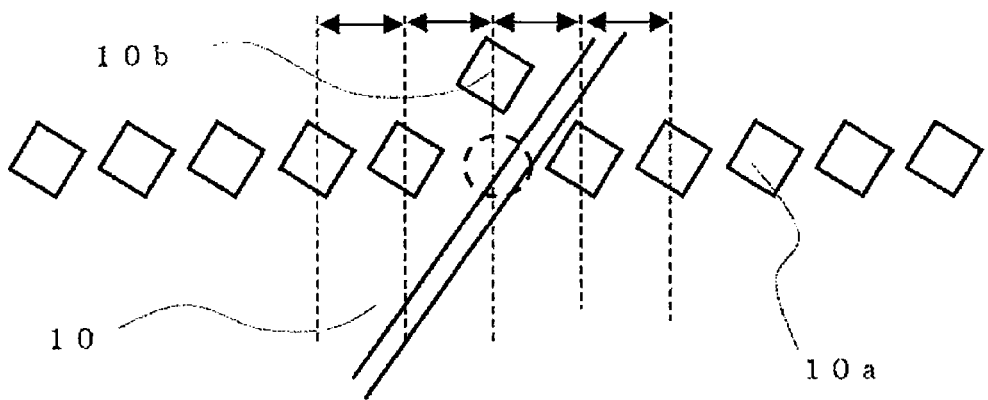
FIG. 13 is a plan view of another example of the image sensor IC in accordance with the first embodiment of the invention.

In the first embodiment, all the four sides of the quadrilateral light receiving and interpolation elements 10a, 10b are disposed at a certain angle with an edge (one opposite side) of the sensor IC 10; however, in the light receiving element 10a and the interpolation pixel 10b, anyone side thereof may be disposed substantially parallel to the edge of the sensor IC 10 as shown in FIG. 13. In this case, a clearance between the edge of the sensor IC 10, and the light receiving element 10a and interpolation pixel 10b can be secured, thereby dealing with an inconvenience due to chips of a sensor chip upon dicing.

Figure 14:
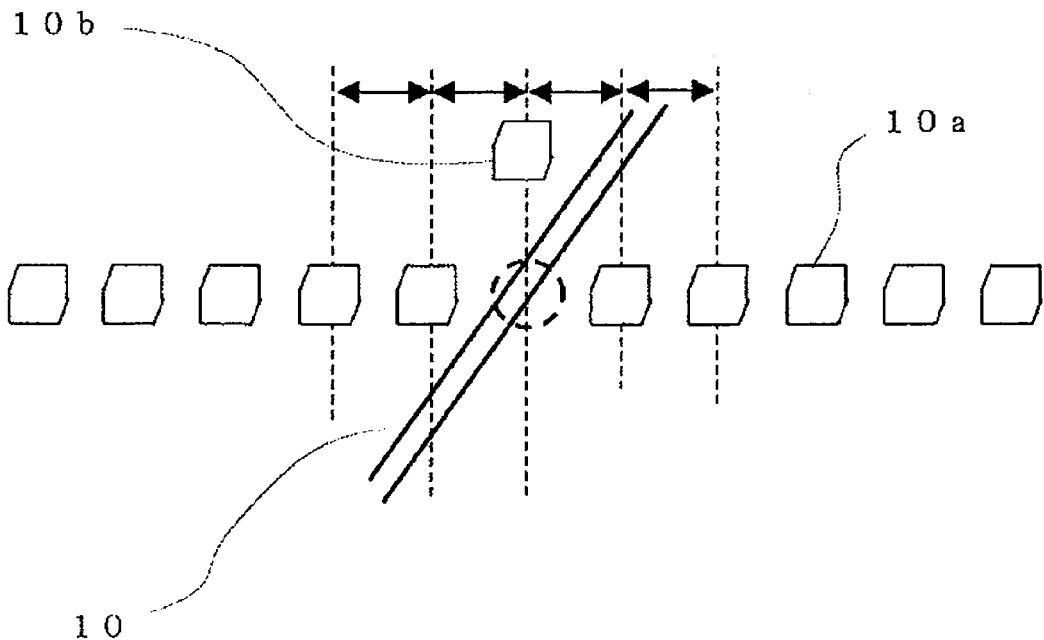
FIG. 14 is a plan view of another example of the image sensor IC in accordance with the first embodiment of the invention.

Further, as shown in FIG. 14, the light receiving element 10a and the interpolation pixel 10b may be formed in a shape having a hexagonal plane or another polygonal shape, taking into consideration a light receiving area in the conveyance direction (sub-scanning direction) and the distance to the edge.

From the above, in accordance with the first embodiment of the invention, a high density-capable image sensor IC in which virtual pixels are not produced even when the sensor ICs 10 are arranged at a predetermined pitch, and a contact image sensor using the image sensor IC are obtained.

Second Embodiment

In the first embodiment, the interpolation pixel 10b is provided at the end portion in the reading direction (terminal end portion), while in a second embodiment, the following case will be described: the interpolation pixel 10b is also provided on a start end portion in the reading direction and on both sides in a conveyance direction at a gap between linearly disposed light receiving elements 10a at the end portions between adjacent sensor ICs 10.

Figure 15:
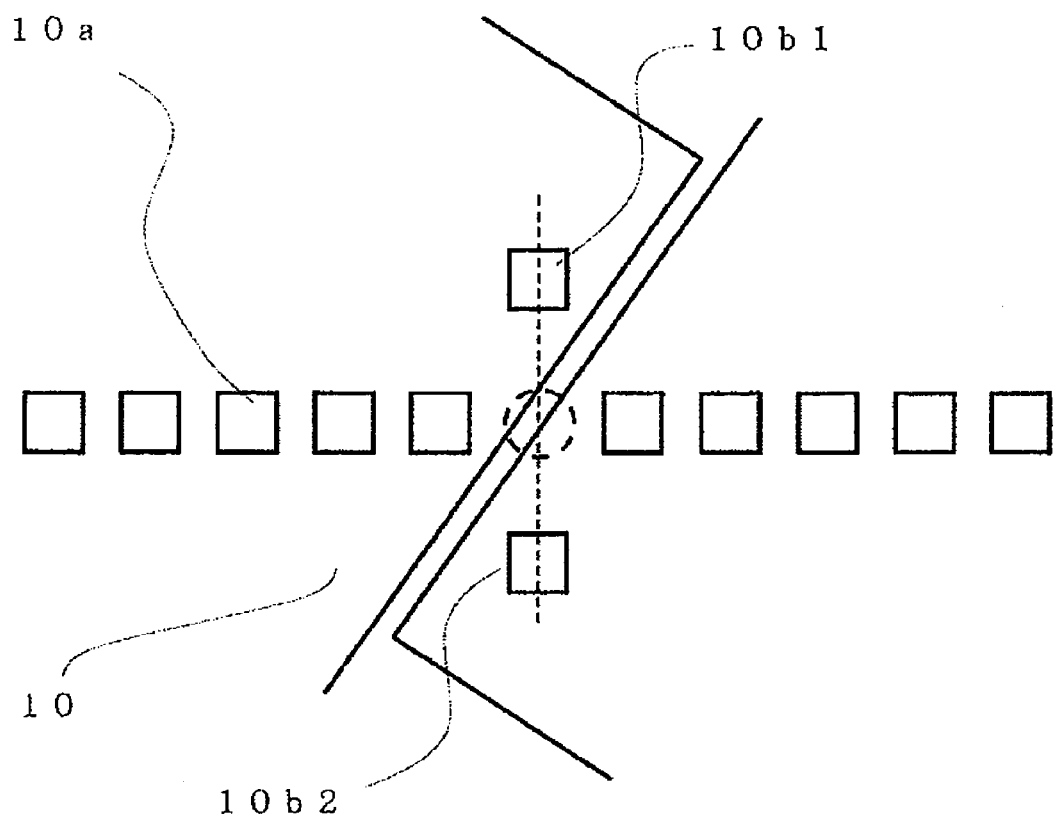
FIG. 15 is a partially enlarged plan view of an image sensor IC in accordance with a second embodiment of the invention.

FIG. 15 is a partially enlarged plan view of an image sensor IC in accordance with the second embodiment of the invention. In FIG. 15, an interpolation element (interpolation pixel) 10b1 is provided at the terminal end portion in the reading direction of the sensor IC 10, and an interpolation element (interpolation pixel) 10b2 is provided at the start end portion in the reading direction of the sensor IC 10. The other positional relationships in FIG. 15 are the same as those discussed in the first embodiment, and descriptions thereof will be omitted. In the drawing, identical reference numerals to those in FIG. 2 denote identical or corresponding parts.

Figure 16:
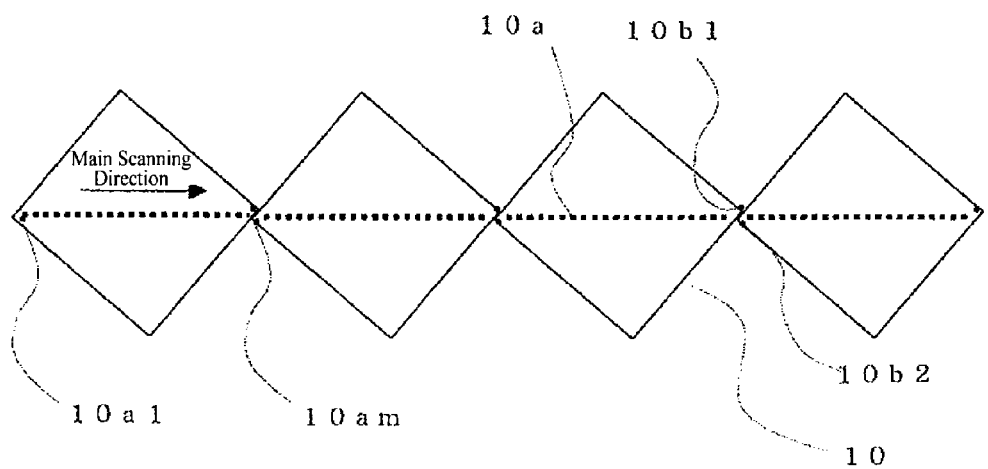
FIG. 16 is a view illustrating a line of sensor ICs in the image sensor IC in accordance with the second embodiment of the invention.

FIG. 16 is a view illustrating a line of sensor ICs in the image sensor IC in accordance with the second embodiment of the invention. The sensor ICs 10 are arranged at a constant pitch, and the light receiving elements 10a are disposed from one corner end portion of the sensor ICs 10 to the other opposing corner end portion. The sensor ICs 10 are equally sized semiconductor substrates, cut from a semiconductor wafer and directly subjected to die-bonding on the sensor substrate 11.

The interpolation pixels 10b1, 10b2 are formed at the corner end portions of the sensor ICs 10 to compensate for virtual pixels. In FIG. 16, the interpolation pixel 10b1 is provided at an end portion on the side of a final pixel 10am as is started from a start pixel 10a1 that is a predetermined position of the sensor IC 10 in the main scanning direction (reading width direction) to be ended at the final pixel 10am. The interpolation pixel 10b2 is provided at an end portion of a start pixel 10a1 as is started from the start pixel 10a1 that is a predetermined position of the sensor IC 10 in the main scanning direction (reading width direction) to be ended at the final pixel 10am. In the drawing, identical reference numerals to those in FIG. 2 denote identical or corresponding parts.

Hence, when the sensor ICs 10 are mounted on the sensor substrate 11 to be used as a contact image sensor, n of the sensor ICs 10 are arranged linearly in the main scanning direction, and therefore the total number of the pixels including the interpolation pixel 10b on either side of the opposed ones in the sub-scanning direction is m×n+n.

Figure 17:
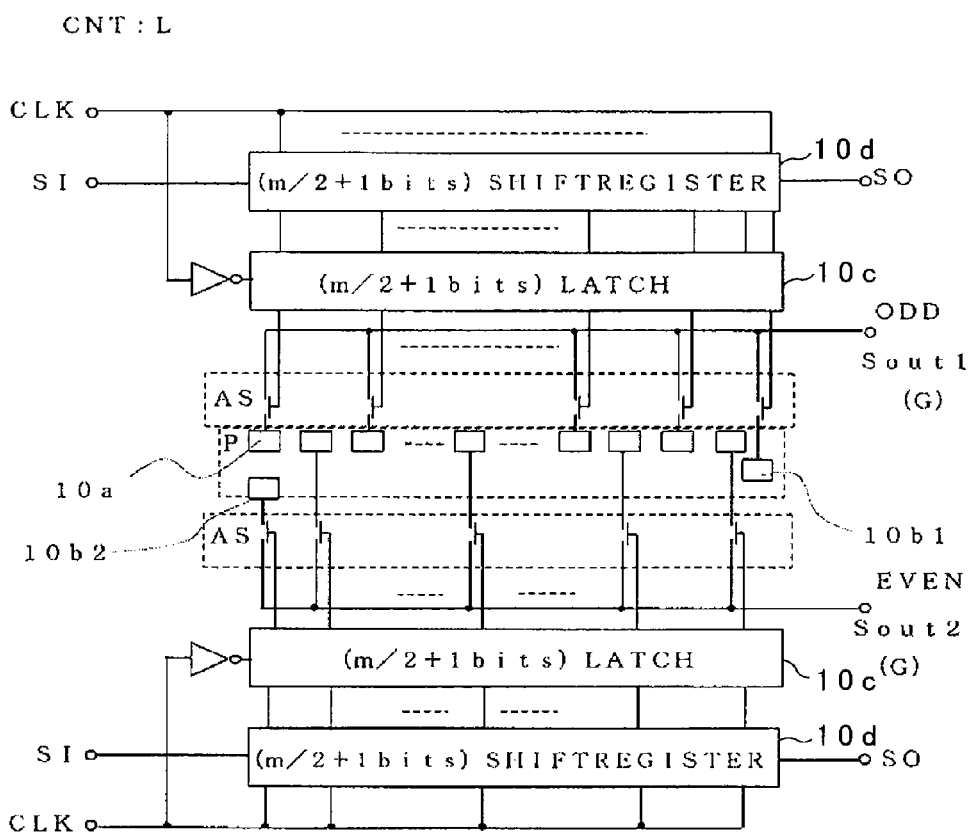
FIG. 17 is an internal circuit diagram of the image sensor IC in accordance with the second embodiment of the invention.

FIG. 17 is an internal circuit diagram of the image sensor IC in accordance with the second embodiment of the invention. The start signal (SI) input in synchronization with the clock signal (CLK) is shifted through the shift register circuit 10d constituted by a D/FF (D/flip-flop) circuit such that an analog switch (AS) connected to the latch circuit 10c is opened/closed sequentially for a charge stored on a previous line of the light receiving element 10a constituted by photodiode (P) or the like. Then, the image outputs are extracted in sequence as analog signals from the image output terminals (Sout1, 2) by the photoelectric conversion currents or voltages connected to the common line. In this circuit, the interpolation pixels 10b1, 10b2 are added respectively to the end portions on one side and the other side of the sensor IC 10 with the light receiving elements 10*a*, and therefore the circuit holds two systems of an m/2+1 bit shift register circuit 10*d* and bit latch circuit 10*c* and an analog switch group.

FIG. 17 illustrates the case of a monochrome reading when the color/monochrome changeover terminal (CNT) is set at logic L. Hence, the analog signal output is extracted from the Sout1 (G) and Sout2 (G), and therefore signals from the other Sout1, 2(R) and Sout1, 2 (B) are unnecessary. In the case of a simultaneous output, only the Sout1, 2 (G) are selected and subjected to signal processing by the signal processing circuit 12. Accordingly, in FIG. 17, a signal extraction circuit is provided as one system of the RGB circuit for illustration of the monochrome reading, while a drive circuit of three systems including the Sout1, 2 (G) is built into the sensor IC 10.

When the analog image data are divided between odd number pixels and even number pixels, the shift register circuit 10*d* and the latch circuit 10*c* are disposed on both sides of the sensor ICs 10 to be easily disposed even when the pixel density is high. The image data divided between odd number pixels and even number pixels are input simultaneously into the data control unit 15, subjected to data position conversion through a rearrangement circuit that outputs the data of odd number and even number alternately, and then stored in the line memory 16. At the same time, the data of the interpolation pixels 10*b*1, 10*b*2 are transposed.

Note that in FIG. 17 the interpolation pixel 10*b*1 is provided on the odd number side of the light receiving elements 10*a* while the interpolation pixel 10*b*2 is provided on the even number side of the light receiving elements 10*a*, and therefore, according to a selection signal, either data of the interpolation pixels is deleted. In other words, the interpolation pixel 10*b*1 is provided on the outer side of the odd-number-side final pixel of the light receiving elements 10*a* while the interpolation pixel 10*b*2 is provided on the outer side of the even-number-side start pixel of the light receiving elements 10*a*, and therefore, in this case, the data of the interpolation pixels 10*b*1, 10*b*2 which are stored in advance in the line memory 16 with respect to the two interpolation pixels 10*b*1, 10*b*2 are selected alternately in accordance with positive and reverse conveyance direction signals (selection signal) with respect to the irradiation subject 4.

Figure 18:
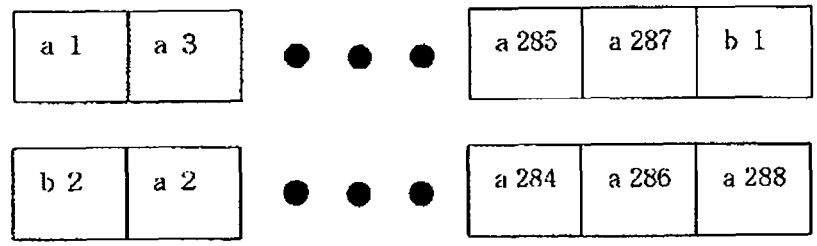
FIG. 18 is a view illustrating a rearrangement of the image data of the image sensor IC in accordance with the second embodiment of the invention, wherein FIG. 18(*a*) illustrates a cell address on a shift register, FIG. 18(*b*) shows a rearrangement sequence, FIG. 18(*c*) illustrates a transposition of interpolation pixels, and FIG. 18(*d*) illustrates an interpolation pixel selection using a selection signal.
Figure 18:
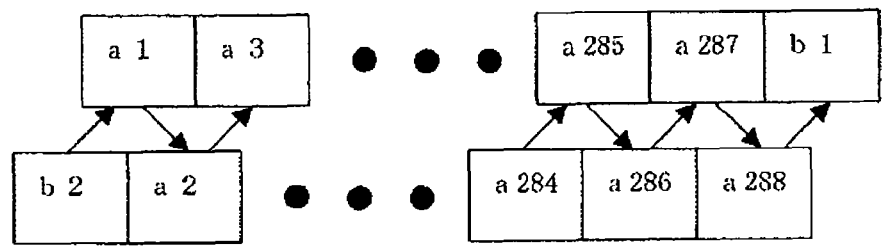
Figure 18:
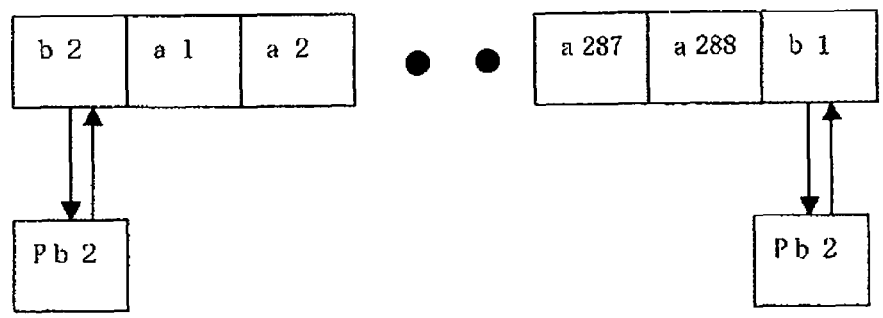
Figure 18:
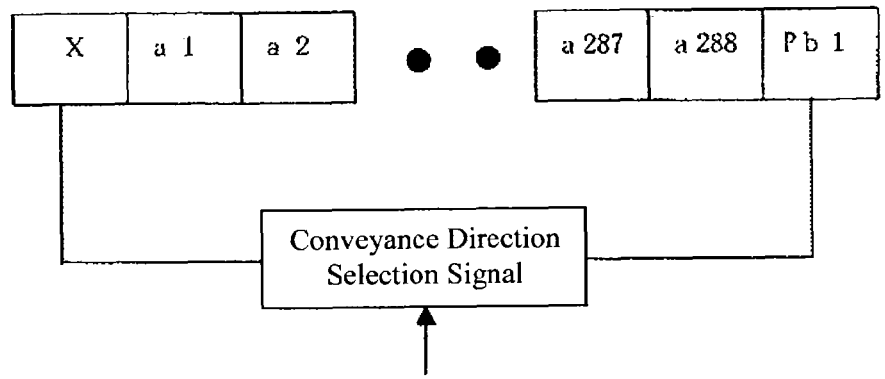

FIG. 18 is a view illustrating an rearrangement of the image data of the image sensor IC in accordance with the second embodiment of the invention, wherein FIG. 18(*a*) shows a cell address on the shift register 10*d*, FIG. 18(*b*) shows a rearrangement sequence, FIG. 18(*c*) shows a transposition of interpolation pixels, and FIG. 18(*d*) shows an interpolation pixel selection using a selection signal.

In FIG. 18, 144 odd numbered pixels (a1 to a287) and one interpolation pixel (b1), as well as 144 even numbered pixels (a2 to a288) and one interpolation pixel (b2), are digitally converted by the analog/digital conversion unit (A/D conversion unit) 14; the data of the 290 pixels are then rearranged in order of cells b2, a1, a2, a3, a284, a285, a286, a287, a288, b1; then, the cells b1, b2 are replaced with the data before several lines; then, either cell data of the cells are deleted by the selection signal, and a data interpolation is carried out as an interpolation for the virtual pixel; finally, 289 bits of image data are transmitted.

Hence, when the sensor ICs 10 are mounted on the sensor substrate 11 to be used as a contact image sensor, n of the sensor ICs 10 are arranged linearly in the main scanning direction, and therefore the total number of the pixels including the interpolation pixel 10*b* is 289×n.

Figure 19:
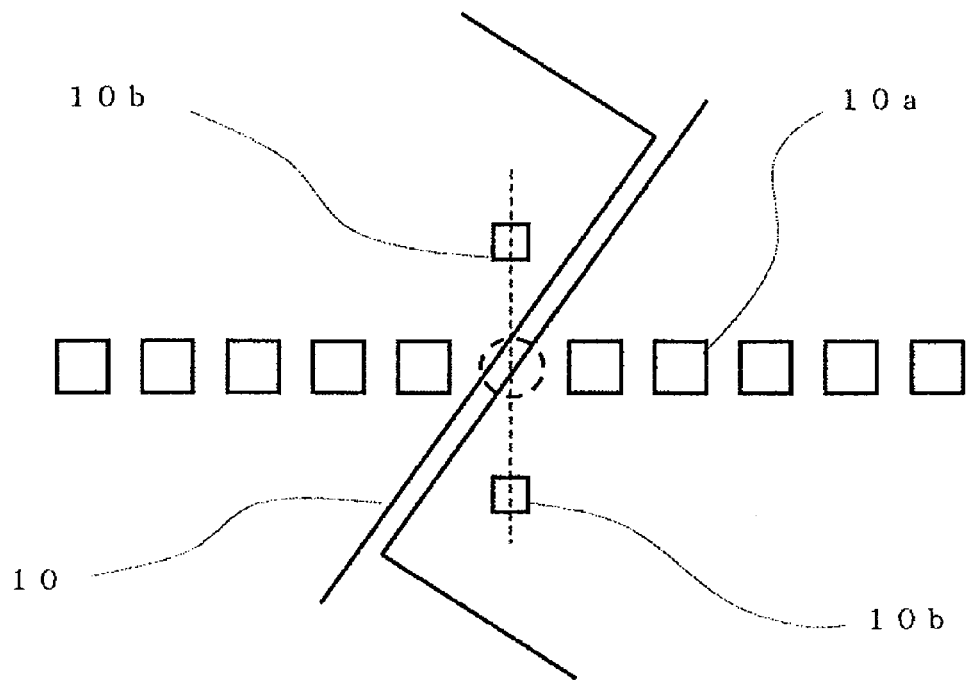
FIG. 19 is a plan view of another example of the image sensor IC in accordance with the second embodiment of the invention.
Figure 20:
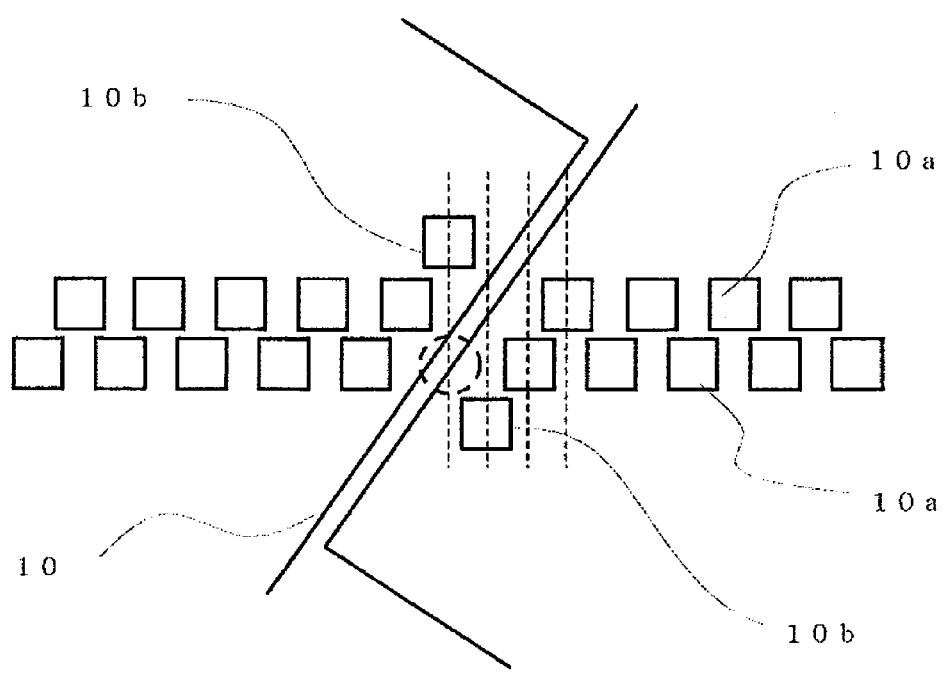
FIG. 20 is a plan view of another example of the image sensor IC in accordance with the second embodiment of the invention.

Note that in the second embodiment, the interpolation pixel 10*b* is provided in the same shape as that of the light receiving element 10*a*; however, as shown in FIG. 19, the interpolation pixel 10*b* and the light receiving element 10*a* may be differently sized. Alternatively, as shown in FIG. 20, the light receiving elements 10*a* may be disposed in a zigzag pattern, and the interpolation pixels 10*b* may be disposed appropriately to compensate for the zigzagged light receiving elements 10*a*.

From the above, in accordance with the second embodiment of the invention, the drive circuits for driving the light receiving elements 10*a*, the interpolation pixels 10*b* and so on are divided between both sides of the semiconductor substrate with the linearly arranged light receiving elements 10*a* as a division, and therefore a high density-capable image sensor IC in which the virtual pixel is not generated even when the sensor ICs 10 are arranged at a predetermined pitch, and a contact image sensor using the image sensor IC are obtained. Furthermore, the interpolation pixels 10*b* are disposed on both sides of the light receiving elements 10*a*, and therefore the interpolation can be easily performed with respect to the virtual pixel even when there occurs a changing between positive and reverse in the conveyance direction of the irradiation subject 4.

Third Embodiment

In the first and second embodiments, the CNT signal is set at "L", and the monochrome reading is mainly described, while in a third embodiment, a case performing a color reading will be described.

Figure 21:
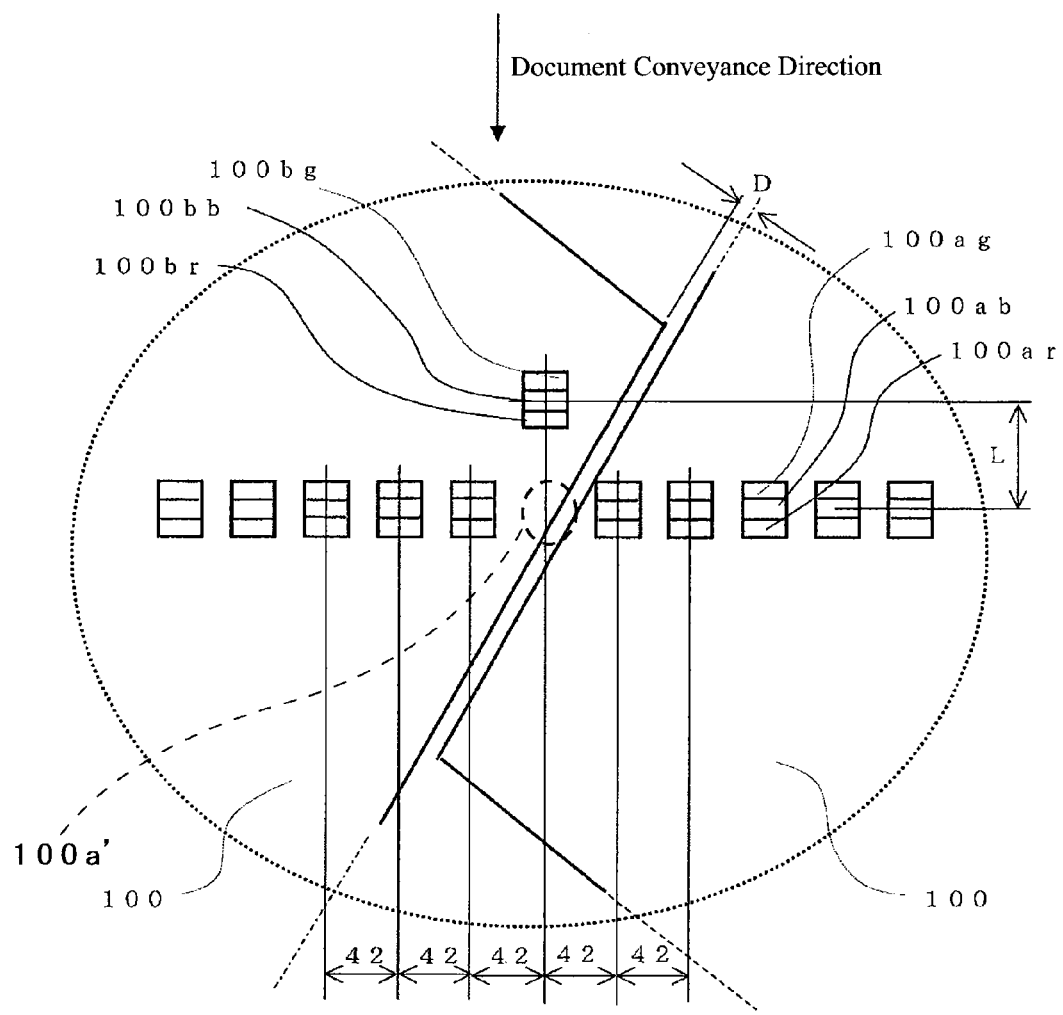
FIG. 21 is a partially enlarged plan view of an image sensor IC in accordance with a third embodiment of the invention.

FIG. 21 is a partially enlarged plan view of an image sensor IC in accordance with the third embodiment of the invention. In FIG. 21, a sensor IC 100 has a light receiving surface on which light receiving elements 100*ag*, 100*ab*, 100*ar* and interpolation elements 100*bg*, 100*bb*, 100*br* are disposed. A green filter that receives light selectively by absorbing or reflecting light having an optical wavelength of approximately 525 nm to transmit or block the light is coated or vapor-deposited on the light receiving surface of the light receiving element 100*ag*. A blue filter that receives light selectively by absorbing or reflecting light having an optical wavelength of approximately 475 nm to transmit or block the light is coated or vapor-deposited on the light receiving surface of the light receiving element 100*ab*. A red filter that receives light selectively by absorbing or reflecting light having an optical wavelength of approximately 640 nm to transmit or block the light is coated or vapor-deposited on the light receiving surface of the light receiving element 100*ar*. All of the elements correspond to the light receiving units of the sensor IC 100.

A green filter that receives light selectively by absorbing or reflecting the light having an optical wavelength of approximately 525 nm to transmit or block the light is coated or vapor-deposited on the light receiving surface of the interpolation element 100*bg*. A blue filter that receives light selectively by absorbing or reflecting the light having an optical wavelength of approximately 475 nm to transmit or block the light is coated or vapor-deposited on the light receiving surface of the interpolation element 100*bb*. A red filter that receives light selectively by absorbing or reflecting the light having an optical wavelength of approximately 640 nm to transmit or block the light is coated or vapor-deposited on the light receiving surface of the interpolation element 100*br*. All of the elements correspond to the light receiving unit of the sensor IC 100.

A plane of the sensor IC 100 takes the shape of a quadrangle, a parallelogram, or a rhombus. The light receiving elements 100*ag*, 100*ab*, 100*ar* are disposed linearly on the sensor IC 100 to be oblique to an end surface of the sensor IC 100. The interpolation elements 100*bg*, 100*bb*, 100*br* are provided at an end portion of the sensor IC 100.

FIG. 21 illustrates a case in which a gap (D) between adjacent sensor ICs 100 to each other is between 0.01 mm and 0.05 mm and respective pixel densities of the light receiving elements 100*ag*, 100*ab*, 100*ar* are approximately 600 DPI. When the light receiving elements 100*ag*, 100*ab*, 100*ar* are arranged linearly at the same pitch of 42 µm, a virtual pixel (light receiving element positioned in a gap region of the IC and unable to be physically formed) 100*a'* is generated. Therefore, the interpolation elements 100*bg*, 100*bb*, 100*br* are formed at an end portion position of the sensor IC 100 orthogonal to the linearly arranged light receiving elements 100*ag*, 100*ab*, 100*ar* to be defined as virtual pixels for the virtual pixel 100*a'*.

The sensor ICs 100 are arranged at a constant pitch, and the light receiving elements 100*ag*, 100*ab*, 100*ar* are disposed from one corner end portion to an opposing corner end portion of the sensor ICs 100. The sensor ICs 100 are equally sized semiconductor substrates, cut from a semiconductor wafer and directly subjected to die-bonding on the sensor substrate 11. All the other configurations correspond to the first embodiment, and description thereof will be omitted.

Figure 22:
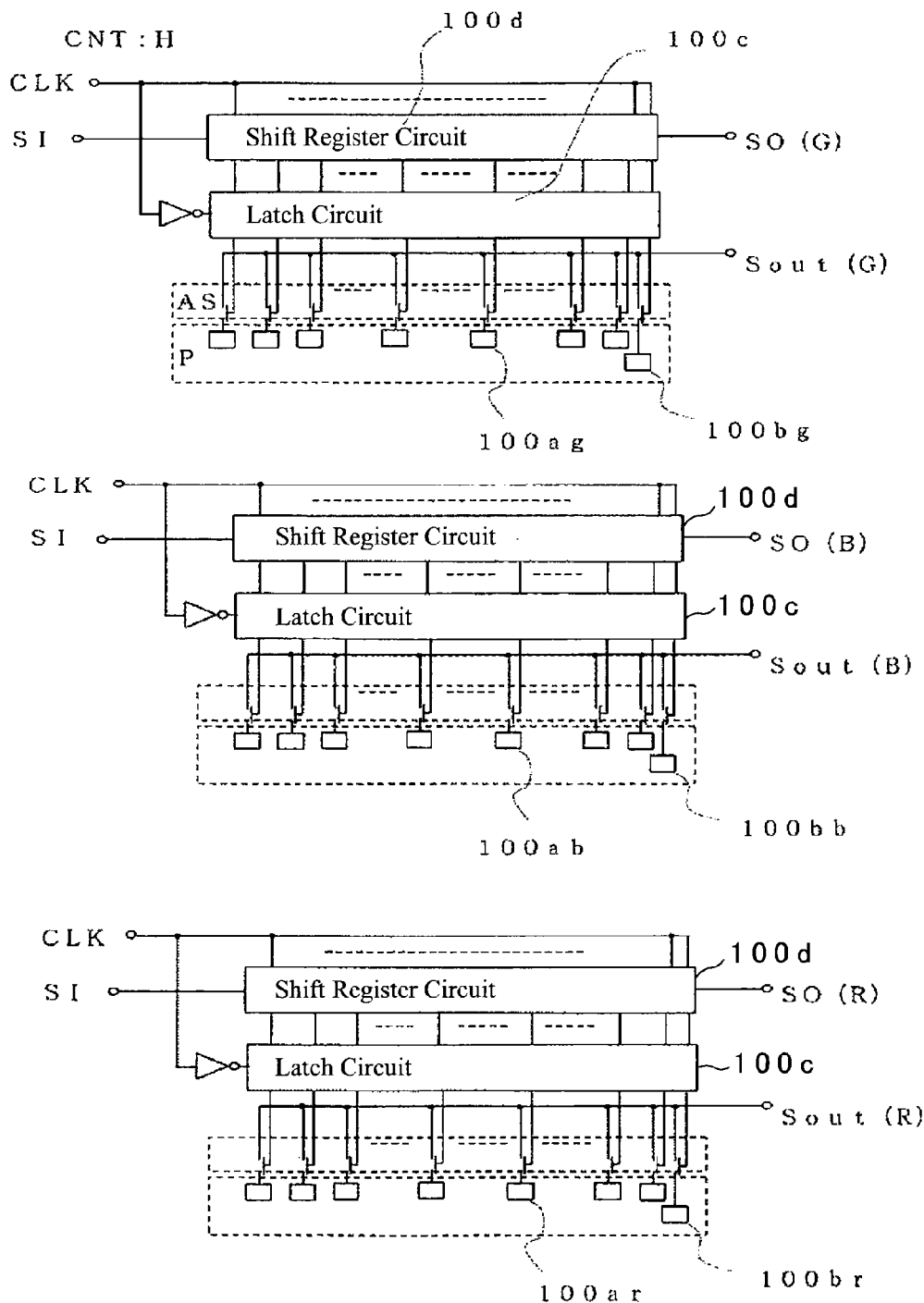
FIG. 22 is an internal circuit diagram of the image sensor IC in accordance with the third embodiment of the present invention.

FIG. 22 is an internal circuit diagram of the image sensor IC in accordance with the third embodiment of the invention. The start signal (SI) input in synchronization with the clock signal (CLK) is shifted through a shift register circuit 100*d* constituted by a D/FF (D/flip-flop) circuit such that an analog switch (AS) connected to the latch circuit 10*c* is opened/closed sequentially for a charge stored on a previous line of the light receiving elements 100*ag*, 100*ab*, 100*ar* constituted by a photodiode (P) or the like. Then, for the image output, photoelectric conversion currents or voltages connected to a common line are read in sequence as analog signals from image output terminals (Sout) of three systems. In this circuit, one of the interpolation pixel is added thereto, and therefore the circuit holds an m+1 shift register circuit 100*d* and latch circuit 100*c* and an analog switch group.

FIG. 22 illustrates the case of a color image reading when the color/monochrome changeover terminal (CNT) is set at logic H. Hence, for the analog signal output, the outputs are extracted from the Sout (G), Sout (B), and Sout (R), respectively. Accordingly, a three-system drive circuit for extracting RGB signals respectively is provided in the sensor IC 100, and according to the input clock signal (CLK) and start signal (SI) in common, the outputs are obtained from the three systems synchronously and simultaneously. In the drawing, identical reference numerals to those in FIG. 21 denote identical or corresponding parts.

Note that although FIG. 22 illustrates the driving of the single sensor IC 100, start pulses input at the start signal input terminal (SI) of the stage sensor IC 100 at a first stage are shifted through the shift register circuit 100*d* and input sequentially at the SI terminal of the sensor IC 100 at a next stage from the start signal output terminal (SO) of the sensor IC 100.

Therefore, for the Sout (R), Sout (G), Sout (B), n of the sensor ICs 100 are arranged linearly in the main scanning direction such that the total number of the pixels including the interpolation pixels 100*bg*, 100*bb*, 100*br* is m×n+n per color; hence, although a sequential output of one line is obtained to the total number of the pixels, each unit of the sensor ICs 10 is driven independently, namely division driven, so that a reading speed per line is a multiple of n.

Figure 23:
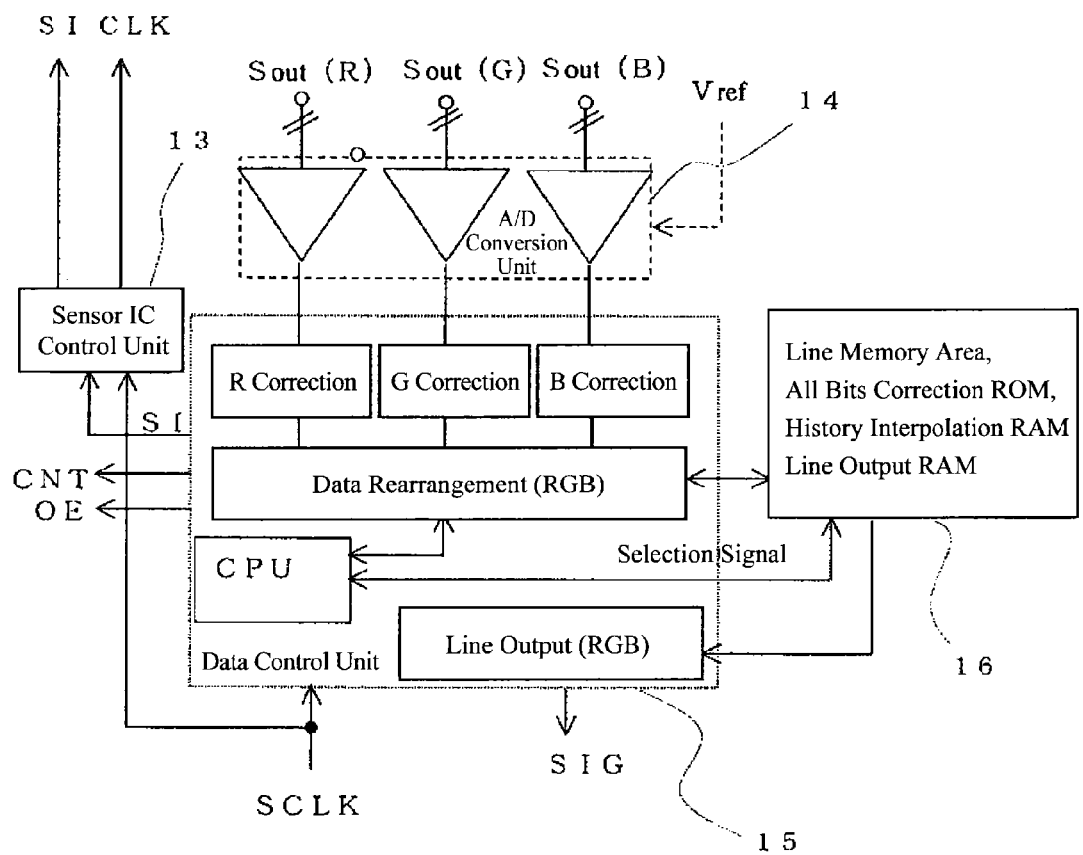
FIG. 23 is a view illustrating a drive circuit of a contact image sensor equipped with the image sensor IC in accordance with the third embodiment of the invention.

FIG. 23 is a view illustrating a drive circuit of a contact image sensor equipped with the image sensor IC in accordance with the third embodiment of the invention. Note that the constitution of the circuit is the same as that illustrated in the first embodiment. FIG. 23 shows three systems in the Sout (R), (G), (B) output from the sensor ICs 100, and shows two systems of an even number mode and an odd number mode in each of the three systems. In the drawing, identical reference numerals to those in FIG. 21 denote identical or corresponding parts.

Next, a circuit operation thereof will be described. The three-system image data of the read interpolation pixels 100*bg*, 100*bb*, 100*br* differ from the three-system image data of the other light receiving elements 100*ag*, 100*ab*, 100*ar* read during the same period in the arrangement position in the orthogonal direction (sub-scanning direction, document conveyance direction) to the main scanning direction, and thereby need to be corrected. Hence, the interpolation pixels 100*bg*, 100*bb*, 100*br* output simultaneously of the digital image data output by the A/D conversion unit 14 are data-stored temporarily in the line memory 16 according to an instruction from the CPU of the data control unit 15, and read later.

Thereafter, when the irradiation subject 4 is conveyed to the reading positions corresponding to the outputs of the light receiving elements 100*ag*, 100*ab*, 100*ar* on the line at the same sub-scanning position as those of the stored interpolation pixels 100*bg*, 100*bb*, 100*br*, the data control unit 15 reads the image data of the interpolation pixels 100*bg*, 100*bb*, 100*br* temporarily stored in the line memory 16 from the line memory 16.

In other words, the data control unit 15 transpose the data of the interpolation pixels 100*bg*, 100*bb*, 100*br* read before several lines with the data of the interpolation pixels 100*bg*, 100*bb*, 100*br* read on the corresponding line (current line), and then outputs the resultant from the ASIC 12 as the final image data (SIG).

For example, in the case that the interpolation pixels 100*bg*, 100*bb*, 100*br* are separated from the other light receiving elements 10*a* by a distance (L) of 84 µm in the document conveyance direction shown in FIG. 21, when the conveyance speed of the irradiation subject 4 is 280 mm/sec, and also the reading speed per section of the contact image sensor is 0.15 ms/line, the data of the interpolation pixel 10*b* are converted to the corrected data after two lines later and then output. In such a way, the image data corresponding to one line on the current line are corrected such that the final image data (SIG) are output without deviations to a positional deviation in the sub-scanning direction between the interpolation pixels 100*bg*, 100*bb*, 100*br* and the other light receiving elements 100*ag*, 100*ab*, 100*ar* on the line.

Figure 24:
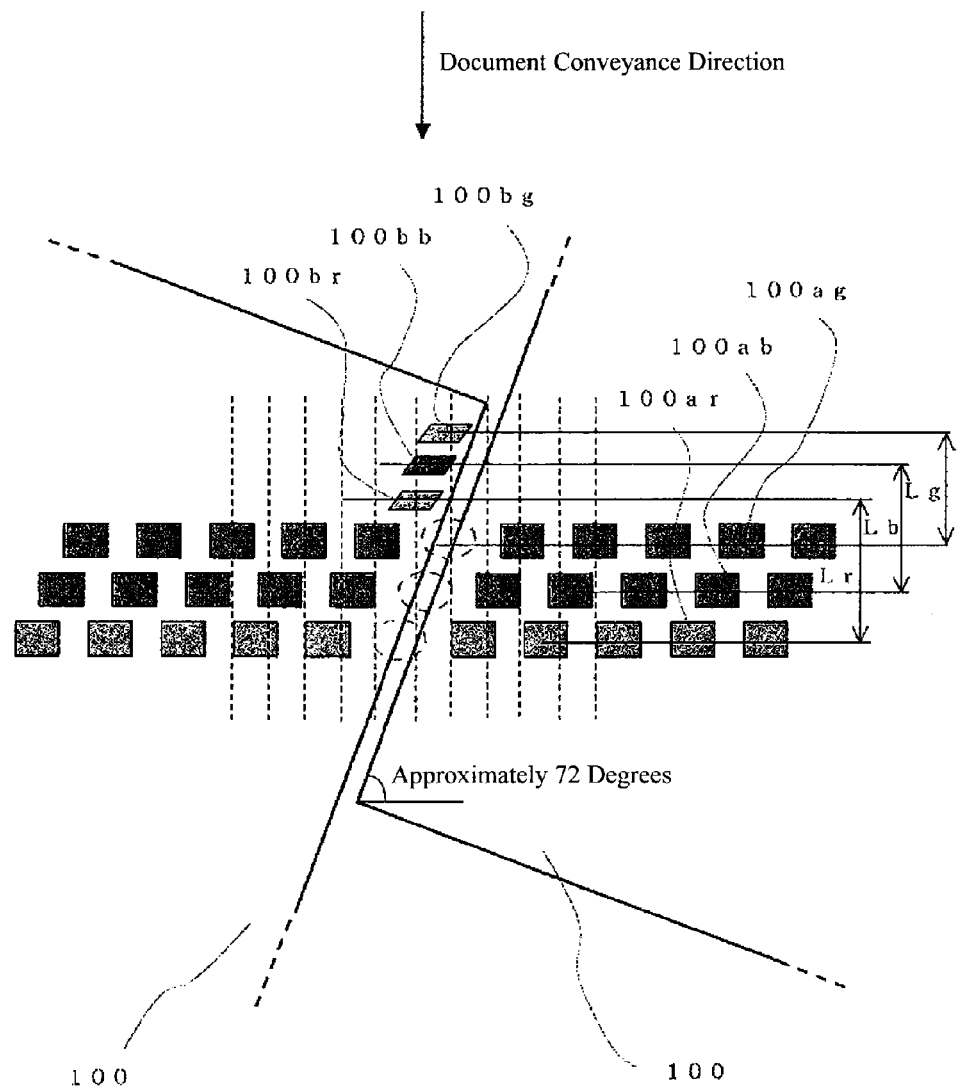
FIG. 24 is a partially enlarged plan view of another example of the image sensor IC in accordance with the third embodiment of the invention.

Next, in FIG. 21, three filters having different optical wavelengths are provided within a single light receiving unit pixel (cell) of the sensor IC 100; however, a case in which only one filter is provided for each light receiving unit pixel will be described. FIG. 24 is a partially enlarged plan view of another example of the image sensor IC in accordance with the third embodiment of the invention. In the drawing, identical reference numerals to those in FIG. 21 denote identical or corresponding parts. In FIG. 24, the light receiving elements 100*ag*, 100*ab*, 100*ar* are divided for each optical wavelength (each color) on the conveyance direction side and respectively disposed linearly parallel to the main scanning direction side. The interpolation elements 100bg, 100bb, 100br are disposed separately on the conveyance direction side for each optical wavelength (each color) at respective fixed distances (Lg, Lb, Lr) from the light receiving elements 100ag, 100ab, 100ar. In other words, the light receiving elements 100ag, 100ab, 100ar and the interpolation elements 100bg, 100bb, 100br are segregated for each different optical wavelength in the conveyance or reverse conveyance direction.

From the above, in accordance with the third embodiment of the invention, a high density-capable image sensor IC in which virtual pixels are not generated even when the sensor ICs 100 are arranged at a predetermined pitch and a contact image sensor using the image sensor IC are obtained, and can also be adapted for the color image reading.

Figure 25:
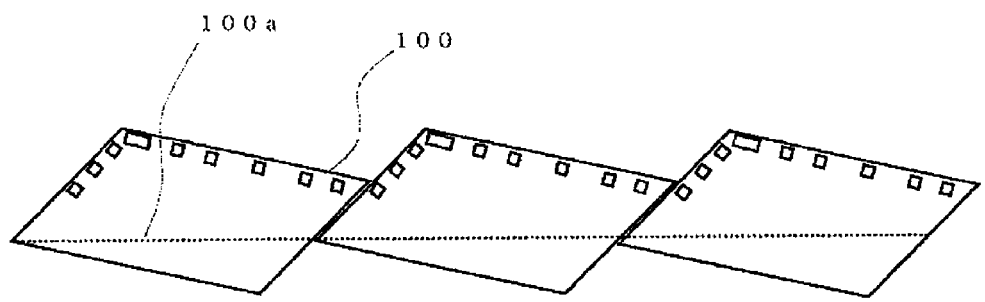
FIG. 25 is a view illustrating a line of sensor ICs in the image sensor ICs in accordance with the first to third embodiments of the invention.

In the first to third embodiments, the light receiving elements are disposed linearly adjacent to each other on the surface of the quadrilateral semiconductor substrate having opposite parallel sides, and further disposed oblique to at least one set of opposite sides from a predetermined position on one side thereof to be opposed in the semiconductor substrate to a predetermined position on the other side thereof; however, as shown in FIG. 25, when the light receiving element 100a starting from a predetermined position on one side is disposed near a center of the one side, and a predetermined position serving as the terminal end of the light receiving elements 100a is disposed near a corner of the other side, the light receiving elements 100a may be in a straight line with the sensor ICs 100 arranged.

Figure 26:
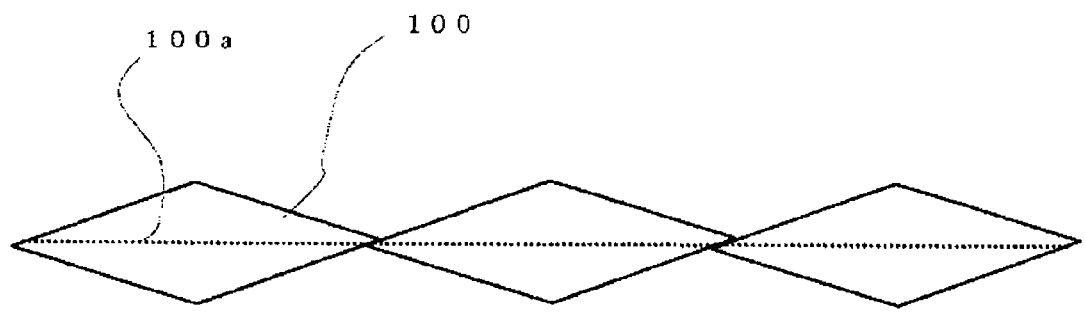
FIG. 26 is a view illustrating a line of sensor ICs in the image sensor ICs in accordance with the first to third embodiments of the invention.

In the first to third embodiments, the light receiving elements are disposed linearly adjacent to each other on the surface of the quadrilateral semiconductor substrate having opposite parallel sides, and further disposed oblique to at least one set of opposite sides from a predetermined position on one side thereof to be opposed in the semiconductor substrate to a predetermined position on the other side thereof; however, as shown in FIG. 26, when the light receiving element 100a starting from a predetermined position on one side is disposed near a corner of the one side, and a predetermined position serving as the terminal end of the light receiving elements 100a is disposed near the corner of the other side, the light receiving elements 100a may be in a straight line with the sensor ICs 100 arranged.

Figure 27:
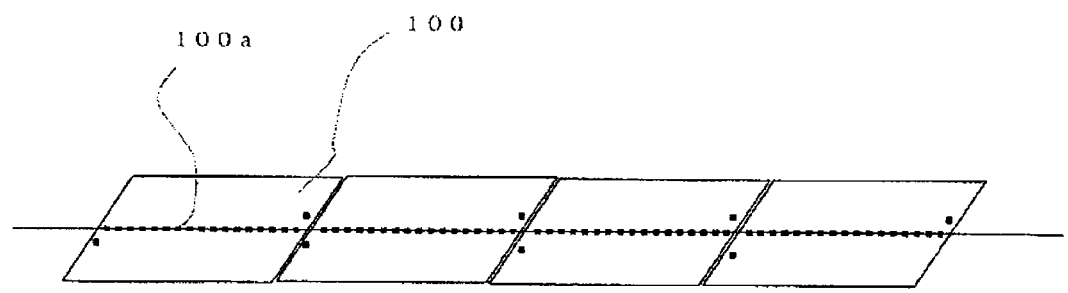
FIG. 27 is a view illustrating a line of sensor ICs in the image sensor ICs in accordance with the first to third embodiments of the invention.
Figure 28:
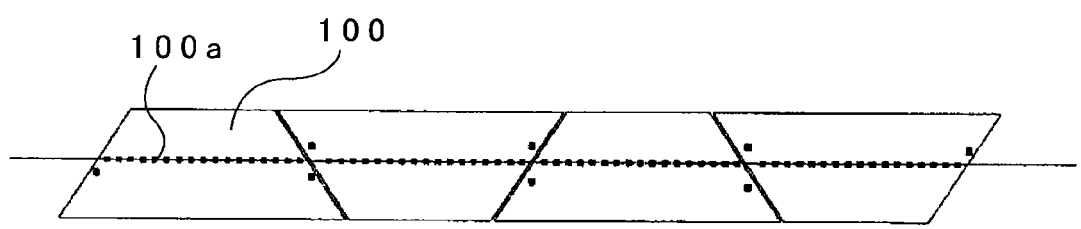
FIG. 28 is a view illustrating a line of trapezoidal sensor ICs.

In the first to third embodiments, the light receiving elements are disposed linearly adjacent to each other on the surface of the quadrilateral semiconductor substrate having opposite parallel sides, and further disposed oblique to at least one set of opposite sides from a predetermined position on one side thereof to be opposed in the semiconductor substrate to a predetermined position on the other side thereof; however, as shown in FIG. 27, when the light receiving elements 100a starting from a predetermined position on one side is disposed near a center of the one side, and a predetermined position serving as the terminal end of the light receiving elements 100a is disposed near a center of the other side, the light receiving elements 100a may be in a straight line with the sensor ICs 100 arranged. In other words, at least one set of opposite sides may be oblique to the light receiving elements 100a.

Note that in the case where the parallelogram-shaped sensors IC shown in FIG. 27 are divided to be arranged by trapezoid sensors IC, when the same sensor ICs are used, data must be rearranged alternately for each sensor IC; thus, a disposing method of interpolation elements is complicated, and also it is hard to dispose a drive circuit for the sensor IC on both sides of linearly disposed light receiving elements, which makes difficult an application thereof to a high resolution-capable sensor IC.

Next, a method of manufacturing pattern-formed sensor ICs 10, 100 on a semiconductor substrate cut out from a wafer will be described. The semiconductor substrate is used, having a thickness of approximately 0.1 to 0.13 mm when a silicon wafer having a thickness of 0.15 mm is subjected to rear surface polishing.

First, on the surface of the semiconductor substrate, patterns to be formed on the substrate are formed using an exposure mask and an exposure device (pattern formation process), the patterns including: a photodiode (P) pattern for receiving light; an analog switch (AS) forming a switching circuit for extracting a charge stored in the photodiode pattern (P); a shift register circuit 10d pattern for opening/closing the analog switch successively; a latch circuit 10c, 100c pattern for temporarily storing an output signal from the shift register circuit 10d, 100d formed by the shift register circuit 10d pattern; a protective film pattern for protecting these patterns, and so on.

Next, after a characteristic test on the sensor ICs 10, 100 formed on the surface of the semiconductor substrate, a large number of sensor ICs 10, 100 formed on the wafer are subjected to cutting using a dicer along scribe lines provided in advance in gaps between adjacent sensor ICs 10, 100 during the pattern formation process. A blade width of the dicer is between 30 μm and 35 μm, and therefore a scribe width is set at 35 μm to 45 μm. Rectangular scribe lines are cut fully in orthogonal XY directions. Parallelogram-shaped scribe lines are cut fully along one set of opposite sides and half-cut along the other set of opposite sides. Rhomboid scribe lines are half-cut along both sets of opposite sides (dicing process).

A UV tape is adhered in advance to the entire rear surface of the semiconductor wafer to prevent the sensor ICs 10, 100 from dispersing. Therefore, next, a UV exposure is performed to reduce an adhesive force between the wafer and the UV tape (UV exposure process).

Next, the sensor ICs 10, 100 using the wafer half-cut in the dicing process are expanded in a half cutting line direction.

Next, the cut sensor ICs 10, 100 are stored in a chip tray or the like for each light amount rank based on the results of the characteristic test, and then subjected to die bonding. Next, the respective terminals (pads) of the sensor ICs 10, 100 are electrically connected to a predetermined pattern on the sensor substrate 11. When the light amount ranks are comparatively constant, the cutout sensor ICs 10, 100 may be mounted directly on the sensor substrate 11 using a die bonder.

Note that with a femtosecond laser such that tears away electrons in silicon through laser irradiation, silicon monocrystal is changed into amorphous silicon under the condition that the modification due to the heat generated on the scribe lines hardly occurs, and therefore the dicing can be performed without damage. Hence, there is no need to differentiate between full cutting and half cutting in the dicing process.

Further, in the case of an image sensor IC, patterns are formed only on a front layer of the sensor ICs 10, 100, and therefore when scribing is carried out from the front side, the image sensor IC can be used in even a slight chip in an end chip or an inclination toward the rear side.

In the above, the respective forms and examples of the image sensor IC and the contact image sensor using the same including the manufacturing method in accordance with the first to third embodiments may be combined with each other.

INDUSTRIAL APPLICABILITY

As described above, since the image sensor IC and the contact image sensor using the same include light receiving elements and interpolation elements, and are configured such that virtual pixels are not generated even when sensor chips are arranged at a predetermined pitch, they can be applied to a facsimile, a copier, a scanner, or the like that uses a multichip type image sensor in a document reading unit.

The invention claimed is:

1. An image sensor IC comprising:
light receiving elements disposed linearly adjacent to each other on a surface of a quadrilateral semiconductor substrate having two sets of opposite parallel sides and corresponding sets of opposite vertices, and disposed oblique to said two sets of opposite sides from a first predetermined position adjacent one side of one of the two sets of opposite sides, to be opposed in said semiconductor substrate to a second predetermined position adjacent the other side of said one of the two sets of opposite sides, the first and second predetermined positions being closer to vertices of one set of opposite vertices than the other set of opposite vertices;
an interpolation element provided at an end portion of said one side or said other side on a side of a region in which an angle formed by said linearly disposed light receiving elements and said one side or said other side is obtuse, said interpolation element having an oblique angle to the linearly disposed light receiving elements and receiving light on an outer side of said linearly disposed light receiving elements; and
a plurality of said semiconductor substrates arranged at an equal pitch, said light receiving elements and said interpolation elements of the plurality of semiconductor substrates respectively extending in a straight line.

2. The image sensor IC according to claim 1, wherein a drive circuit for driving said light receiving elements and said interpolation element is divided between both sides of at least one of the sets of opposite sides of said semiconductor substrate, with said linearly disposed light receiving elements as a division.

3. The image sensor IC according to claim 1, wherein a plurality of filters having different optical wavelengths that transmit or block light are respectively coated or vapor-deposited on light receiving surfaces of said individual light receiving elements and said individual interpolation element.

4. The image sensor IC according to claim 1,
wherein filters having different optical wavelengths that transmit or block light are coated or vapor-deposited on light receiving surfaces of said light receiving elements and said interpolation element, and
wherein said light receiving elements and said interpolation element are segregated into a conveyance direction or a reverse conveyance direction for each different optical wavelength.

5. A contact image sensor comprising:
an image sensor IC having light receiving elements disposed linearly adjacent to each other on a surface of a quadrilateral semiconductor substrate having two sets of opposite parallel sides and corresponding sets of opposite vertices, and disposed oblique to said two sets of opposite sides from a first predetermined position adjacent one side of one of the two sets of opposite sides, to be opposed in said semiconductor substrate to a second predetermined position adjacent the other side of said one of the two sets of opposite sides, the first and second predetermined positions being closer to vertices of one set of opposite vertices than the other set of opposite vertices, and an interpolation element provided at an end portion of said one side or said other side on a side of a region in which an angle formed by said linearly disposed light receiving elements and said one side or said other side is obtuse, said interpolation element having an oblique angle to the linearly disposed light receiving elements and receiving light on an outer side of said linearly disposed light receiving elements;
a lens body disposed along said light receiving elements of said image sensor IC, and converging light reflected by an irradiation subject conveyed in a conveyance direction to cause said image sensor IC to receive said light;
a sensor substrate on which said image sensor IC is mounted; and
a plurality of said semiconductor substrates arranged at an equal pitch, said light receiving elements and said interpolation elements of the plurality of semiconductor substrates respectively extending in a straight line.

6. The contact image sensor according to claim 5, wherein a drive circuit for driving said light receiving elements and said interpolation element is divided between both sides of at least one of the sets of opposite sides of said semiconductor substrate, with said linearly disposed light receiving elements as a division.

7. The contact image sensor according to claim 5, wherein a plurality of filters of different optical wavelengths that transmit or block light are respectively coated or vapor-deposited on light receiving surfaces of said individual light receiving elements and said individual interpolation element.

8. The contact image sensor according to claim 5,
wherein filters having different optical wavelengths that transmit or block light are coated or vapor-deposited on light receiving surfaces of said light receiving elements and said interpolation element, and
wherein said light receiving elements and said interpolation element are disposed linearly in parallel to a conveyance direction or a reverse conveyance direction for each different optical wavelength.

* * * * *